United States Patent
Chen et al.

(10) Patent No.: US 7,634,464 B2
(45) Date of Patent: Dec. 15, 2009

(54) DESIGNING RECORD MATCHING QUERIES UTILIZING EXAMPLES

(75) Inventors: Bee-Chung Chen, Madison, WI (US); Venkatesh Ganti, Redmond, WA (US); Kaushik Shriraghav, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 248 days.

(21) Appl. No.: 11/424,191

(22) Filed: Jun. 14, 2006

(65) Prior Publication Data
US 2007/0294221 A1 Dec. 20, 2007

(51) Int. Cl.
*G06F 17/30* (2006.01)
*G06F 7/00* (2006.01)

(52) U.S. Cl. .............................................. 707/3; 707/4
(58) Field of Classification Search ........................ None
See application file for complete search history.

(56) References Cited

U.S. PATENT DOCUMENTS

| | | | | |
|---|---|---|---|---|
| 6,047,284 | A * | 4/2000 | Owens et al. | 707/4 |
| 6,449,609 | B1 * | 9/2002 | Witkowski | 707/4 |
| 6,618,727 | B1 * | 9/2003 | Wheeler et al. | 707/10 |
| 6,721,754 | B1 * | 4/2004 | Hurst et al. | 707/102 |
| 6,792,414 | B2 | 9/2004 | Chaudhuri et al. | |
| 6,795,819 | B2 * | 9/2004 | Wheeler et al. | 707/3 |
| 6,912,549 | B2 | 6/2005 | Rotter et al. | |
| 6,961,721 | B2 * | 11/2005 | Chaudhuri et al. | 707/1 |
| 6,965,888 | B1 * | 11/2005 | Cesare et al. | 707/1 |
| 7,007,017 | B2 * | 2/2006 | Bergholz et al. | 707/4 |
| 7,296,011 | B2 * | 11/2007 | Chaudhuri et al. | 707/3 |
| 7,370,057 | B2 * | 5/2008 | Burdick et al. | 707/102 |
| 2004/0019593 | A1 | 1/2004 | Borthwick et al. | |
| 2004/0148287 | A1 | 7/2004 | Manion et al. | |
| 2004/0181526 | A1 * | 9/2004 | Burdick et al. | 707/6 |
| 2004/0249789 | A1 * | 12/2004 | Kapoor et al. | 707/2 |
| 2004/0260694 | A1 * | 12/2004 | Chaudhuri et al. | 707/5 |
| 2005/0027717 | A1 * | 2/2005 | Koudas et al. | 707/100 |
| 2005/0097150 | A1 * | 5/2005 | McKeon et al. | 707/202 |
| 2005/0144163 | A1 * | 6/2005 | Tang et al. | 707/3 |
| 2005/0154615 | A1 | 7/2005 | Rotter et al. | |

(Continued)

FOREIGN PATENT DOCUMENTS

CA 2304387 4/2000

OTHER PUBLICATIONS

Muralidhar Krishnaprasad, et al. Query Rewrite for XML in Oracle XML DB. Proceedings of the 30th VLDB Conference, Toronto, Canada, 2004. 12 pages.

(Continued)

*Primary Examiner*—Tim T. Vo
*Assistant Examiner*—Michelle Owyang
(74) *Attorney, Agent, or Firm*—Lee & Hayes, PLLC

(57) ABSTRACT

The subject disclosure pertains to a powerful and flexible framework for record matching. The framework facilitates design of a record matching query or package composed of a set of well-defined primitive operators (e.g., relational, data cleaning . . . ), which can ultimately be executed to match records. To assist design of such packages, a learning technique based on examples is provided. More specifically, a set of matching and non-matching record pairs can be input and employed to facilitate automatic package generation. A generated package can subsequently be transformed manually and/or automatically into a semantically equivalent form optimized for execution.

16 Claims, 17 Drawing Sheets

U.S. PATENT DOCUMENTS

2005/0256740 A1 11/2005 Kohan et al.
2005/0278357 A1 12/2005 Brown et al.
2006/0031189 A1 2/2006 Muras et al.

OTHER PUBLICATIONS

Raghu Ramakrishnan, et al. SRQL: Sorted Relational Query Language. 1998 IEEE. Published in the Proceedings of SSDBM'98, Jul. 1-3, 1998 in Capri, Italy. 12 pages.
Ingolf Geist, et al. Combining a Formal with an Example-driven Approach for Data Integration. http://mordor.prakinf.tu-ilmenau.de/papers/sattler/fdbs01.pdf. Last accessed Apr. 11, 2006. 19 pages.
Soumen Chakrabarti, et al. Distributed Hypertext Resource Discovery Through Examples. Proceedings of the 25th VLDB Conference, Edinburgh, Scotland, 1999. 12 pages.
Agichtein, et al "Mining Reference Tables for Automatic Text Segmentation", In Proceedings of ACM SIGKDD, 2004. 10 pages.
S. Argamon-Engelson, et al."Committee-Based Sample Selection for Probabilistic Classifiers", Journal of Artificial Intelligence research, 1999. 26 pages.
M. Bilenko, et al. "Riddle: Repository of Information on Duplicate Detection, Record Linkage, and Identity Uncertainty". http://www.cs.utexas.edu/users/ml/riddle. 1 pg. Last Accessed: Jun. 19, 2006.
M. Bilenko, et al. "Adaptive Duplicate Detection Using Learnable String Similarity Measures", In Proceedings of ACM SIGKDD, 2003, 10 pages.
V. Borkar, et al. "Automatic Segmentation of Text Into Structured Records", In Proceedings of ACM SIGMOD, 2001. 12 pages.
L. Breiman, et al. "Classification and Regression Trees", Wadsworth, 1984. pp. 1-50.
L. Breiman, et al. "Classification and Regression Trees", Wadsworth, 1984. pp. 51-111.
L. Breiman, et al. "Classification and Regression Trees", Wadsworth, 1984. pp. 112-172.
L. Breiman, et al. "Classification and Regression Trees", Wadsworth, 1984. pp. 173-233.
L. Breiman, et al. "Classification and Regression Trees", Wadsworth, 1984. pp. 234-294.
L. Breiman, et al. "Classification and Regression Trees", Wadsworth, 1984. pp. 295-358.
S. Chaudhuri, et al. "Robust and Efficient Fuzzy Match for Online Data Cleaning", In Proceedings of ACM SIGMOD, 2003. 12 pages.
S. Chaudhuri, et al. "A primitive operator for similarity joins in data cleaning", In Proceedings of ICDE, 2006. 12 pages.
W. Cohen, "Integration of Heterogeneous Databases Without Common Domains Using Queries Based on Textual Similarity", In Proceedings of ACM SIGMOD, 1998. 12 pages.
W. Cohen, et al. "Learning to Match and Cluster Large High-Dimensional Data Sets for Data Integration", In Proceedings of ACM SIGKDD, 2002. 6 pages.
W. Cohen, "Data Integration Using Similarity Joins and a Word-Based Information Representation Language", ACM Transactions on information systems, 2000. 34 pages.
I. P. Felligi, et al. "A Theory For Record LInkage", Journal of the American Statistical Society, 1969. 29 pages.
H. Galhardas, et al. "Declarative Data Cleaning: Language, Model, and Algorithms", In Proceedings of VLDB, 2001. 10 pages.
L. Gravano, et al. "Approximate String Joins in a Database (almost) for Free", In Proceedings of VLDB, 2001. 10 pages.
D. Haussler, "Quantifying Inductive Bias: Ai Learning Algorithms and Valiant's Learning Framework", Artificial Intelligence, 1988. 45 pages.
M. Hernandez, et al. "The Merge/Purge Problem for Large Databases", In Proceedings of ACM SIGMOD, 1995. 12 pages.
J. Quinlan, "C4.5: Programs for Machine Learning", Morgan Kaufmann Publishers Inc., 1993. pp. 1-55.
J. Quinlan, "C4.5: Programs for Machine Learning", Morgan Kaufmann Publishers Inc., 1993. pp. 56-121.
J. Quinlan, "C4.5: Programs for Machine Learning", Morgan Kaufmann Publishers Inc., 1993. pp. 122-184.
J. Quinlan, "C4.5: Programs for Machine Learning", Morgan Kaufmann Publishers Inc., 1993. pp. 185-247.
J. Quinlan, "C4.5: Programs for Machine Learning", Morgan Kaufmann Publishers Inc., 1993. pp. 248-302.
V. Raman, "Potter's Wheel: An Interactive Data Cleaning System", In Proceedings of VLDB, 2001. 10 pages.
S. Sarawagi, et al. "Interactive Deduplication Using Active Learning", In Proceedings of ACM SIGKDD, 2002. 10 pages.
S. Sarawagi, et al. "Efficient Set Joins on Similarity Predicates", In Proceedings of ACM SIGMOD, 2004. 12 pages.
A. Simitsis, et al. "Optimizing ETL Processes in Data Warehouse" In Proceedings of ICDE, 2005. 12 pages.
S Tejada,et al. "Learning Domain-Independent String Transformation Weights for High Accuracy Object Identification", In Proceedings of ACM SIGKDD, 2002. 10 pages.
S. Tejada, et al. "Learning Object Identification Rules for Information Integration", Information Systems, 2001. 29 pages.
T. Software. www.trilliumsoft.com/trilliumsoft.nsf. 1 pg. Last Accessed: Jun. 19, 2006.

* cited by examiner

Person Enquires: R

| ID | Name | Address | City | State | Zip | Mothers Name | Fathers Name |
|---|---|---|---|---|---|---|---|
| 1 | Gail Smith | 10 Main St | Chicago | Illinois | 60602 | Mary Smith | *NULL* |
| 2 | Kevin J | #1344 Mont Ave | *NULL* | Wisc | 53593 | Stephanie Jones | |
| 3 | Sandra C | #245 First Ave | | Texus | | NULL | Charles Calvin |
| ... | ... | ... | ... | ... | ... | ... | ... |

Registered Persons: S

| ID | Name | Address | City | State | Zip | Mothers Name | Fathers Name |
|---|---|---|---|---|---|---|---|
| 1 | Gershwin K | 35 Forest Dr | Verona | WI | 53593 | Georgia K | Ben Kirsten |
| 2 | Mary Green | 24 Second Ave | Verona | WI | 53593 | Emma Green | Anthony Green |
| 3 | Ted Johnson | 412 Madison St | Verona | WI | 53593 | Olivia J | Ethan Johnson |
| 4 | C. Larson | 18 Main St | Fitchburg | WI | 53593 | Ashley Larson | Michael Larson |
| 5 | G. Smith | 135 Dayton St | Redmond | WA | 98052 | Mary Carlton | Tom Smith |
| 6 | Gavin Clark | 50 Frontier Ave | Chicago | IL | 60608 | Elma Clark | Bart Clark |
| ... | ... | ... | ... | ... | ... | ... | ... |

Fig. 2a

Table CityList

| City |
|---|
| Redmond |
| Chicago |
| Irving |
| ... |

Table StateCode

| City | Code |
|---|---|
| Redmond | WA |
| Chicago | IL |
| Irving | TX |
| ... | |

Fig. 2b

Feature Table of Training Examples

| R.ID | S.ID | $f_1$(City) | $f_1$(State) | $f_2$(City) | ... | $f_3$(City, State) | Class |
|---|---|---|---|---|---|---|---|
| 2 | 8 | 0.83 | 0.33 | 0.73 | ... | 0.70 | 0 |
| 34 | 3 | 0.34 | 0.42 | 0.50 | ... | 0.59 | 0 |
| 7 | 3 | 0.90 | 0.38 | 0.89 | ... | 0.80 | 0 |
| 43 | 78 | 0.81 | 0.62 | 0.90 | ... | 0.82 | 0 |
| 21 | 9 | 0.92 | 0.55 | 0.98 | ... | 0.91 | 1 |
| 5 | 31 | 0.21 | 0.79 | 0.33 | ... | 0.45 | 0 |
| 68 | 11 | 0.39 | 0.83 | 0.71 | ... | 0.55 | 1 |
| 34 | 63 | 0.80 | 0.94 | 0.82 | ... | 0.59 | 1 |
| 3 | 87 | 0.78 | 0.88 | 0.69 | ... | 0.77 | 1 |

DESIGNING RECORD MATCHING QUERIES UTILIZING EXAMPLES

BACKGROUND

Record matching or linking is the task of identifying records that correspond to the same entity from the same or different data stores. Record matching is useful with respect to improving data quality and standardization. Accordingly, record matching can be employed in data scrubbing or data cleaning, for example in data warehousing applications or the like.

Data cleaning is an essential step in populating and maintaining data warehouses and central data repositories. A significant data cleaning operation is that of "joining" similar data. For example, consider a sales data warehouse. Owing to various errors in data such as typing mistakes, differences in conventions or formats, product names and customer names in sales records may not match exactly with a master catalog and reference customer records, respectively. In these situations, it would be desirable to match similar records across relations. This problem of matching similar records has been studied in the context of record linkage and of identifying approximate duplicate entities in databases.

Given two relations R and S, the goal of the record matching or linking problem is to identify pairs of records in R×S that represent the same real world entity. Most conventional approaches proposed for solving this problem usually compare pairs of tuples according to one or more similarity functions and then declare pairs with high similarities to be matches. In one conventional approach, the similarity function could determine how many deletions, substitutions or insertions are needed to transform a string from one to another. For example, "California" may be sufficiently similar (within a threshold) to mistyped "Califonia" to be deemed a match, as all that is needed is to insert the letter "i." The main conventional focus is thus on identifying similarity functions and efficient implementations thereof.

It is also to be noted that it is often not clear that a single similarity function will be best in all scenarios. Hence, recent work has focused on identification and utilization of a combination of similarity functions. For instance, if function A produces a value greater than a threshold and function B yields a result greater than another threshold, then the entities can be treated as matching.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to generation of queries or packages to address the task of record matching. More specifically, techniques are provided to facilitate learning record matching queries based on a set of examples. The record matching queries are composed of primitive operators (e.g., relational and data cleaning operators) that are easily interpreted and modified by programmers to aid in, among other things, domain specific implementation and/or improvements in efficiency.

In accordance with an aspect of the innovation, a framework is provided for a two-phase automatic record matching package generation. First, an initial package is generated or learned. To accomplish this task, a similarity feature table is generated for relations based on a set of provided examples identifying matches and non-matches. A decision tree can be constructed from the similarity feature table and subsequently translated into a package composed of primitive operators, or a representation thereof. In the second stage, the generated package can be optimized for execution, for instance by replacing any cross products with similarity joins.

According to yet another aspect of the innovation, additional primitive operators are introduced to facilitate record matching. For example, a split operator is provided to partition input relations into multiple disjoint subsets. Additionally, a FD (functional dependency) operator is disclosed that exploits knowledge of functional dependencies to correct missing and incorrect values in a record, even where the functional dependency is soft in that it holds for a large subset of the data or when a perfectly accurate reference table is not available.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

FIGS. 2a-c illustrate exemplary tables and a package produced to facilitate understanding of aspects of the innovation.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

The task of record matching is modeled herein not as a single monolithic operation as previously done but as that of designing a record matching query (also referred to herein as a package) obtained by composing primitive operators including relational operators and data cleaning operators, such as approximate joins between relations based on similarity functions, attribute value translations based on joins with standard reference tables, derived column values and attribute value correction based on a measure of functional dependency. By formulating record matching over a program built over primitive operators, the innovation significantly generalizes the class of current record matching approaches.

The flexibility in allowing design of packages over primitive operators, however, causes the task of developing a record matching package to become much harder. To address this hardness in design, a technique is provided for assisting programmers in designing accurate record matching packages. More specifically, a package can be automatically generated or learned from a set of training examples that identify matches and non-matches. These packages can then be optimized for execution. Furthermore, the technique for learning packages is flexible in that it can allow and respect constraints specified by designers to control the learning, for example based on knowledge of a domain or efficiency.

Figure 1:
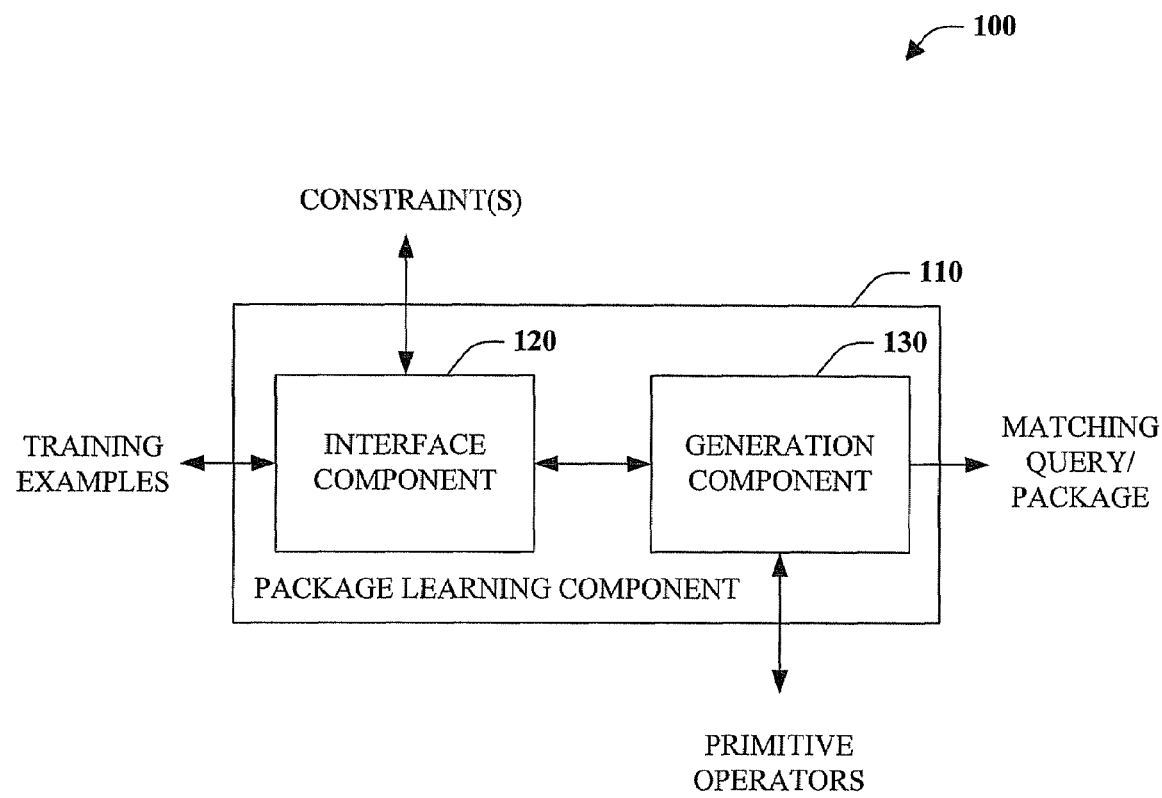
FIG. 1 is a block diagram of a system that facilitates record matching.

Referring initially to FIG. 1, a system 100 that facilitates record matching is illustrated in accordance with an aspect of the innovation. The system 100 includes a package learning component 110 including an interface component 120 and a generation component 130. The package learning component 110 can output a matching query or package over a set of available primitive operators from a set of training examples, among other things. In particular, interface component 120 can receive, retrieve or otherwise obtain a set of training examples. The training examples specify matches and non-matches for example as specified by a designer. The interface component 120 can also receive one or more constraints such as structural constraints, which can stem from knowledge of the domain or from an efficiency point of view, among other things. This information can then be transmitted or otherwise made available to the generation component 130.

Figure 2C:
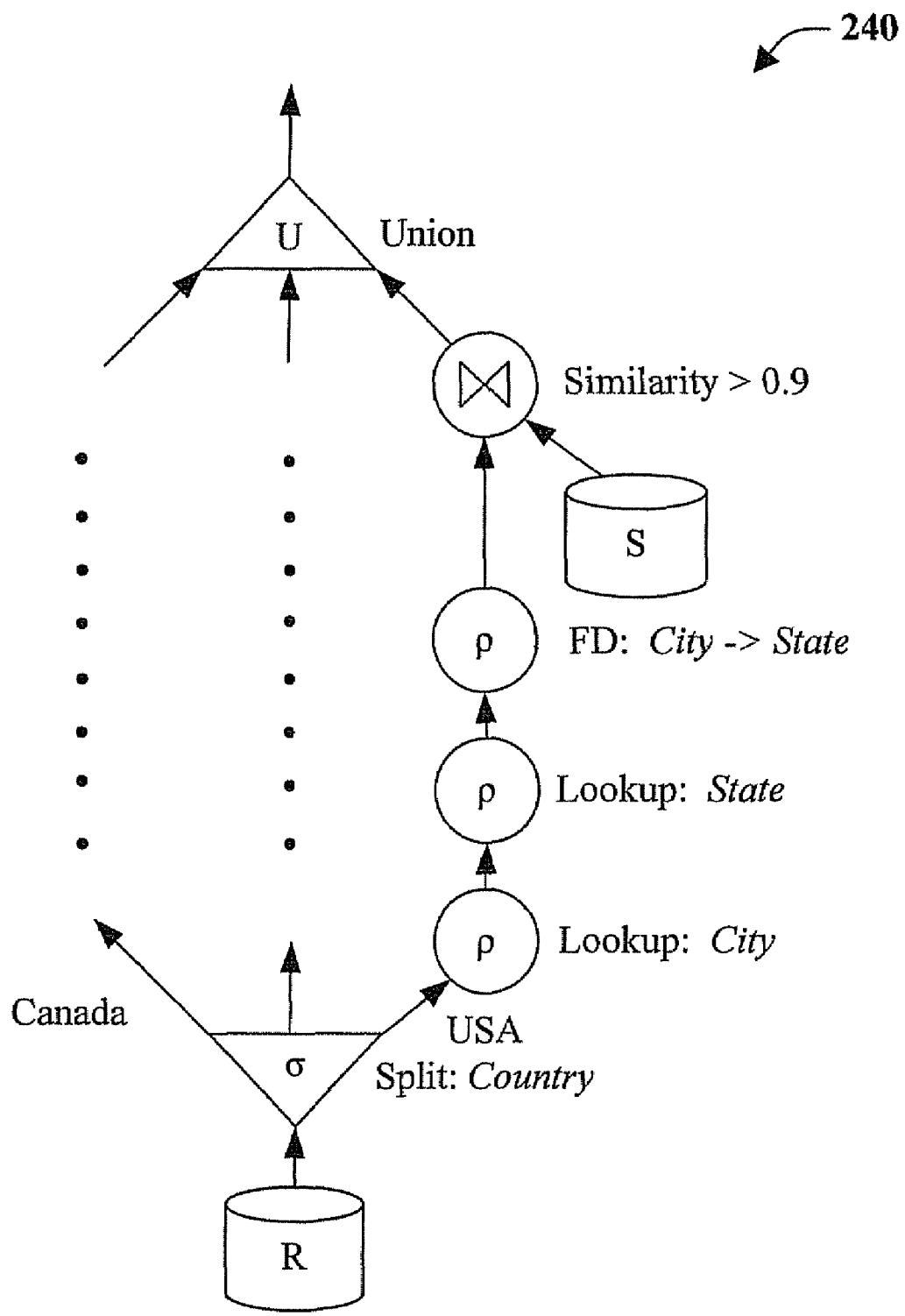

The generation component 130 can produce a matching query or package, based on the training examples and optional constraints, which is composed of one or more primitive operators. Referring briefly to FIG. 2c, an exemplary representation of a record matching package 240 is illustrated. The package 240 replaces current input values (e.g., city names or state names) with those obtained by referring to reference and translation tables (FIG. 2b) before comparing input tuples in Table R to those in Table S (FIG. 2a). Effectively the generation component 130 solves the record matching problem.

Formally, the goal of record matching is to identify matching record pairs between tables or relations R and S. Assume that the schemas of R and S can be reconciled (e.g. attribute names in R have been mapped to corresponding attribute names in S). Further, assume for reasons of clarity that the corresponding attribute names in R and S are identical. Let the schema of R (and S) be $\Sigma=\{ID, A_1, \ldots, A_n\}$. Dom(A) is used where $A \subseteq \Sigma$, to denote the domain (set of values) of attribute set A. In fact, if $A=\{A_1, \ldots, A_n\}$, Dom(A)=Dom$(A_1)\times \ldots \times$Dom$(A_n)$. Dom($\Sigma$)×Dom($\Sigma$) is referred to as the cross-product space. Informally, the answer U to the record matching problem is a subset of the cross-product space. That is, $U \subseteq R \times S \subseteq$ Dom($\Sigma$)×Dom($\Sigma$). In sum, let R and S be two relations with identifier attributes R.ID and S.ID, respectively. The goal of a record matching problem between two relations R and S is to identify a relation U of matching pairs, where $\Pi_{R.ID, S.ID} U \subseteq \Pi_{R.ID, S.ID}(R \times S)$.

Observe that in general a record matching package can be an arbitrary function, which can include arbitrary operations. Record matching packages can be restricted to be built upon a pre-defined set of primitive operators—including both data cleaning and relational operators. This restricted class of packages is fairly general and includes all generic record matching techniques known in the art. However, the innovation is not so limited. It should be appreciate that system 100 can support plug-ins that identify new and/or different primitive operators that are not known by or native to the system. Throughout this description, a set of available operators is meant to encompass those native to a system as well as pluggable operators.

Given two relations, there is a large number of choices for creating a record matching package using a set of available primitive operators. Further, these choices usually lead to different solutions (i.e., different subsets of R×S). To identify the best or close to the best record matching package among all possible candidates, the quality of a record matching package should be quantified. The notion of quality can be quantified using a set of examples. An example is a record pair belonging to R×S along with a binary label (e.g., 1 or 0) indicating whether or not the two records match. For instance, one can correspond to a match and zero can correspond to a non-match. Let $\Delta$ be a set of examples, each of which belongs to Dom($\Sigma$)×Dom($\Sigma$)×Dom(Class), where Dom(Class)=\{0, 1\}. Informally, the quality of a package with respect to the example set $\Delta$ is the amount of (weighted) error a package makes over $\Delta$. Consider the recommendations of a package over the pairs of tuples in the example set $\Delta$. If a package classifies a pair of records as matching (respectively, non-matching) when it is marked as a non-matching (respectively, matching) pair in $\Delta$, then it is an error. The total error quantifies the quality of a package.

Formally, package error can be defined as follows: Let P be a record matching package over input relations R and S, and $\Delta \subseteq R \times S \times$Dom(Class) be a set of examples. Let $n_{01}$ (and $n_{10}$) be the number of non-matching (matching) examples in $\Delta$ that are misclassified as matches (non-matches) by P, and $c_{01}$ (and $c_{10}$) be the cost of misclassifying a non-matching (matching) example as a matching (non-matching) one. Then, the error of P on $\Delta$ is $c_{01}*n_{01}+c_{10}*n_{10}$.

The package creation problem solved by generation component 130 can now be defined more formally as: Given relations R and S, and a set $\Omega$ of primitive operators, determine the record matching package P* which has the minimum error on R×S×Dom(Class) among all record matching packages built using only operators in $\Omega$.

The above formulations suggest that it be ascertained whether or not each pair in R×S matches. However, that is exactly the information needed to obtain to be obtained from the package. Therefore, a standard machine learning approach can be employed where the goal is to learn a package which does well on a set $\Delta$ of training examples and also generalizes well to examples not in $\Delta$ (i.e., R×S−$\Delta$). This generalization requirement has been addressed in machine learning literature while building models over training datasets. Thus, the innovation is able to exploit known machine learning techniques. Additionally, many techniques for generating training example collections such as active learning can also be incorporated herein.

For purposes of understanding, a number of primitive operators are now described that can be combined to form record matching packages. It should be noted that what follows is a description of only some of the operators and types of operators that may be utilized to generate matching query packages. The scope of the innovation is not to be construed as limited thereto.

The generation component 130 can utilize one or more of relational and data cleaning operators. The innovation can employ standard relational operators including select, union and cross product. However, a distinction is made with respect to classes of selections, namely regular selections with predicates based on attribute values and those with predicates based on similarity functions (e.g., edit distance, longest common prefix, cosine similarity . . . ). The latter class is particularly important with respect to comparing record pairs. Besides the relational operators, many data-cleaning operators can be employed. For example, the similarity join operator, which joins pairs of similar records across two relations, can be utilized. Further, the fuzzy lookup operators can be used, which generalizes the standard lookup operation and has been shown to be very useful for standardizing erroneous values using domain-specific reference tables. In addition to these previously known operators a new functional dependency (FD)-correction operator is disclosed for correcting attribute values using functional dependencies (e.g., soft). These operators are described in further detail below. First, however, is a description of another new operator: split.

The split operator partitions its input relation into multiple disjoint subsets, thus it can be seen as the inverse of a union operator. The split operator can be used as syntactic sugar to simplify description of the learning algorithm. In practice, this operator can be utilized or alternatively replaced with standard relational selections. Herein, splits are considered that split based on the values assumed by a single attribute, either numeric or categorical. Given a numeric attribute A and a threshold value $\alpha$, the split operator partitions a relation into two parts. The first partition includes records with A greater than or equal to $\alpha$; the second partition includes the rest of the records. For a categorical attribute A, the split operator paritions the given relation into n parts, where n is the number of distinct values in Dom(A). It should be appreciated that the split operator can be generalized to return fewer partitions by grouping attribute values into sets. The numeric split operator can be defined more formally as $\sigma_{A \geq \alpha}$: Given a relation T, a numeric attribute A, and a threshold value $\alpha$, $\sigma_{A \geq \alpha}(T)$ splits T into two parts $\sigma_{A \geq \alpha}(T)$ and $\sigma_{A < \alpha}(T)$. The categorical split $\sigma_A$ can be defined as: Given a relation T, a categorical attribute A, $\sigma_A(T)$ splits T into |Dom(A)| subsets: $\sigma_{A=a}(T)$, for all $a \in Dom(A)$.

Turning attention to data cleaning operators we consider similarity selection, similarity join, fuzzy lookup and FD-correction in more detail. The similarity selection operator filters out record pairs whose similarity, as measured by a specific function, is less (or greater) than a given threshold. More formally, let $f(R.A, S.A):Dom(R.A) \times Dom(S.A) \mapsto [0, 1]$ be a similarity function, where R.A and S.A are sets of attributes, and $f(R.A, S.A)=1$ iff the corresponding attribute values are identical. The similarity selection operator is a filter $\sigma_p$, where the predicate p is of the form $f(R.A, S.A) \geq \alpha$ or $f(R.A, S.A) < \alpha$.

The similarity join operator between two relations R and S is a cross product between R and S followed by a similarity selection operator. In order to facilitate efficient implementations, it is defined as a distinct operator. Note that the similarity join generalizes the equi-join operator (instantiated when the similarity threshold is set to 1). Formally, the similarity join operator $R \bowtie_p S$, where the join predicate p is of the form $f(R.A, S.A) \geq \alpha$ outputs all record pairs in $R \times S$ with similarity $f(R.A, S.A) \geq \alpha$.

For both the similarity selection and the similarity join operators, the similarity function used to compare attribute values is itself configurable. The subject innovation allows the choice to be specified by a programmer or to be selected automatically according to the desired criteria of creating a good record matching package. Standard similarity functions such as Jaccard similarity with (IDF) weights on tokens, edit similarity, longest common prefix, and the like can be considered for use.

A lookup operator is useful for standardizing values based on domain specific lookup tables. For example, state values in the U.S.A. may be abbreviated to two-character postal codes based on a translation table obtained from the U.S. postal service. Turning briefly to FIG. 2*b*, state code table 230 illustrates such a table.

The lookup translation would proceed as follows. Given an input relation R and the lookup table L, one could lookup the value r[State] for each record r∈R against L. If r[State] is equal to l[State] for some record l∈L, r[State] can be replaced with l[StateCode]; otherwise r[State] remains unchanged. Observe that this operation may be implemented as a left outer-join between R and L on the State attribute followed by a case (switch) statement for replacing the R.State value with that from L. For example, lookup translation using the state code in table 230 in FIG. 2*b*, would transform the record r=[ . . . , "10 Main St", "Chicago", "Illinois", . . . ] in R (FIG. 2*a*) to [ . . . , "10 Main St", "Chicago", "IL", . . . ].

In general, the value r[State] may not match exactly with any value in L[State] due to errors in r, for instance, 'Texus' instead of 'Texas' in table 210 of FIG. 2*a*. In such cases, it is very useful to relax the match to allow approximate matches. That is, join the value r[State] with the most similar value in L[State] as long as the similarity, as measured by a given similarity function, is above a user-specified threshold $\alpha$. When multiple L[State] values have the same highest similarity value, tie-breaking mechanisms can be employed. This operator is called the fuzzy lookup operator and takes a threshold value as an input, and has been shown to be very effective in dealing with input errors.

The fuzzy lookup operator generalizes the lookup operator (instantiated when the threshold is set to 1). Thus, herein the fuzzy lookup operator is considered. Like for the similarity selection and join operators, the similarity function for the fuzzy lookup operator is configurable and can be chosen by a learning based technique or specified by a user.

Formally, the fuzzy lookup operator can be defined as follows: Let R be the input relation, L the lookup table, B the set of join attributes of R and L, Y the set of output attributes in L. Attribute set Y is compatible with B in that attribute values r[B] of record r∈R may be substituted by l[Y] of record l∈L. Let f(R.B, L.B) be a similarity function and $0 < \alpha \leq 1$. The fuzzy lookup (FL) operator FL(L, B, Y, f, $\alpha$) for record r∈R returns the record with r[B] being replaced by the value l[Y] of the record l∈L that maximizes the value f(r[B], l[B]) if $f(r[B], l[B]) \geq \alpha$; if no such l exists, the FL operator returns r unchanged. The fuzzy lookup on relation R returns a relation where each r∈R is transformed as above.

Turning attention to the FD-correction operator, this operator exploits reference tables and the knowledge of functional dependencies to correct missing and incorrect values in a record, even when the functional dependency is soft in that it holds for a large subset of the data, or when there is not a perfect reference table.

As an illustrative example, consider a relation consisting of USA addresses {Address, City, State, Zip}. The functional dependency Zip→City is an example of a soft functional dependency. This dependency does not always hold because a few zip codes may actually be associated with multiple cities. Further, there may not be a perfect reference table recording the ideal {Zip, City} combinations. However, this information may still be used to correct several errors in the city values. For example, in FIG. 2a, 210, say one desires to fill in the City value of the second record in table R based on its Zip code 53593 by using the cleaner table S as the reference table. Say, in S, the first four records form the group of all records of S having Zip code 53593. In this group, 75% of the records have City value Verona. If one believes 75% is high enough to say Verona is the dominant City value in this group, then NULL value in the second record of R can be replace with Verona. Note that the reference table can also be R itself if desired. This operator may be applied when the discrepancies in the groups are caused by errors (such as missing values or spelling errors). In order to avoid conflicts while determining the dominant value in a group, the threshold on the majority percentage can be restricted to be above 50%. Otherwise, there may be multiple dominant values and it may be hard to decide which to use.

The FD-correction operator can be defined formally as follows: Given a multi-set S of values, it can be said that a value v∈S is $\alpha$-dominant in S if more than $\alpha$% of values in S are equal to value v. Let R be the input relation. Given a reference relation L, a (soft) functional dependency A→B, where A and B are sets of attributes both in R and L, and a threshold $50<\alpha\leq100$, the FD-correction operator FD(L, A, B, $\alpha$) on a record r∈R returns the record where r[B] is replaced by the $\alpha$-dominant B value in $\sigma_{A=r[A]}(L)$ (i.e., the group of all records in L that share the same A value as r[A]); if no dominate value exists, the FD-correction returns r unchanged. The FD-correction operator on relation R transforms each record in R.

Both fuzzy lookup and the FD-correction transform an attribute value based on the value in attribute set A. The transformation itself may use external sources of information such as reference tables or rules, or be based on other functions. This can be accomplished by a rename operator. The rename operator can be defined $\rho_{g(A,\theta):B}$, where $g(A, \theta)$ is a rename function that returns a value in Dom(B)∪{NULL} based on set A of attributes and parameter (threshold) value $\theta$, and B is the set of attributes to be renamed. For record r, $\rho_{g(A,\theta):B}$ (r) returns the record with r[B] being replaced by $g(r[A], \theta)$ if $g(r[A], \theta)\neq$NULL; otherwise, the record is unchanged. For relation R, $\rho_{g(A,\theta):B}$ (R) returns $\cup_{r\in R}\{\rho_{g(A,\theta):B}(r)\}$.

The fuzzy lookup operator can be written as $\rho_{g1(A,\theta):A}$, where g1(A, $\theta$) is the function that returns the standardized A value from the lookup table if the similarity on the join attributes is at least $\theta$. Similarly, the FD-correction operator for A→B can be written as $\rho_{g2(A,\theta):B}$, where g2(A, $\theta$) is the function that returns the $\theta$-dominant B value in the group (e.g., in the reference table) sharing the same A value if the dominant value exists. Note that for simplicity of expression, the lookup table (in the fuzzy lookup case) and the reference table (in the FD-correction case) are encapsulated into the rename function g. Since both the fuzzy lookup and the FD-correction can be represented by the general rename operator, hereinafter discussion with be focused solely on the rename operator.

It should be appreciated that the subject innovation can be extended with a rich class of instantiations of the rename operator, beyond fuzzy lookup and FD-correction. More operators enrich the expressive power of the packages, and quite likely the accuracy of the resulting package. What is characterized now is a class of operators that can instantiate the rename operator. Any operator that produces exactly one tuple for each input tuple and which commutes with the union operator can instantiate the rename operator. That is, applying the operator to a relation R is equivalent to applying the operator to each individual record r∈R and then taking the union over the results of each application.

Consider another operator, segmentation, which takes an attribute value R.A and segments it into constituent attribute values $A_1, \ldots, A_k$ based on regular expressions. Such an operator is extremely useful for identifying target attribute values across a variety of domains: addresses, media databases, etc. For instance, conventional commercial address cleaning tools (e.g., Trillium) rely heavily on this operator, which they call "parsing." The output for each record r is independent of the output for another record t, and thus commutes with the union operator. Hence, it can instantiate the rename operator. The concatenation operator, which is the inverse of segmentation, concatenates multiple columns together, can also instantiate the rename operator. Note that both these operators modify the schema of input relations. Even though the discussion herein assumes, for reasons of clarity, that schema is not modified we note that the subject innovation is general enough to handle segmentation and concatenation operators.

Yet another operator can be the association rule application operator. Consider such an operator defined using the set of association rules, mined from a relation R, whose confidences are above a threshold $\alpha$ (e.g., $\alpha$>50%). An input record r may trigger application of several association rules. Applying these rules in a consistent (e.g., predefined) order would yield a new record r'. The association rule application operator can be applied in a number of scenarios, where the input values may be missing or incorrect (e.g., like FD-operator but with broader applicability). This operator satisfies the properties required for instantiating the rename operator.

Figure 3:
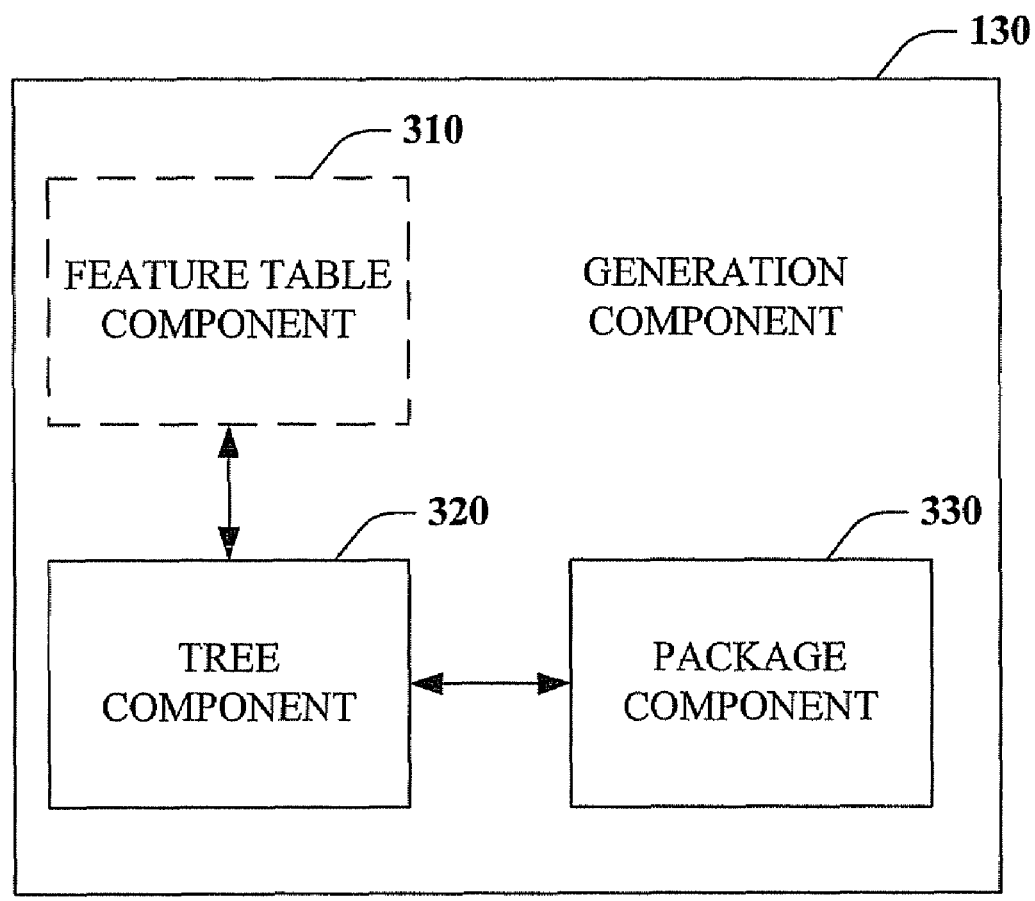
FIG. 3 is a block diagram of a package generation/learning component.

Referring now to FIG. 3, a generation component 130 is illustrated in further detail in accordance with an aspect of the subject innovation. As depicted, the generation component 130 comprises feature table component 310, tree component 320 and package component 330. Briefly, the feature table component 310 functions to generate a similarity feature table based on training examples and similarity functions. This feature table can be employed by the tree component 320 to produce a decision tree base on the information provided therein. It is to be noted that the feature table component 310 can be optional. In such a scenario, the tree component 320, or other associated component, can dynamically compute required similarities as needed. Generation of the feature table can be efficient in that similarities would not need to be recomputed. It should also be appreciated that the feature table may need to be updated (e.g., adding new columns, modifying values . . . ) to enable subsequent usage, for example where a rename operator is added to a current package. The package component 330 utilizes the decision tree supplied by tree component 320 to produce a record matching query package, for instance by utilizing a top-down tree-structured greedy search. What follows is a more detailed description of the process generation component 130 implements to solve the package creation problem utilizing the identified components.

It is assumed that the generation component 130 has access to a set $\Delta$ of training examples, and the goal is to learn an accurate record matching package utilizing this set. The class of packages described herein after is restricted to those having a cross product operator between R and S as the first operator. This restriction facilitates understanding and enables the system to adapt existing machine learning techniques to the package creation problem. It should be appreciated that the innovation is not limited thereto.

As discussed supra, the generation component 130 is can learn packages over a set Ω of available primitive operators from a training set Δ of examples. Recall that it is assumed that the first operator in the package is going to be a cross product between input relations. It is said that a partially specified operator is one where only attribute names and table names (where required) are specified. In contrast, a fully specified operator also specifies threshold values (e.g., similarity threshold . . . ). In accordance with one embodiment, exemplary table 1, below, depicts information to be specified by a user and that to be automatically determined for each operator in Ω that is chosen.

TABLE 1

| Operator | User-specified | Auto-determined |
|---|---|---|
| Similarity selection $\sigma_{f(A1,A2)} \geq \alpha$ | $f, A_1, A_2$ | $\alpha$ |
| Categorical split $\sigma_A$ | A | (none) |
| Numeric split $\sigma_A \geq \alpha$ | A | $\alpha$ |
| Rename operator $\rho_{g(A, \theta):B}$ | g, A, B | $\theta$ |
| Fuzzy lookup $FL_{L,B,Y,f,\theta}$ | L, B, Y, f | $\theta$ |
| FD-correction $FD_{L,A,B,\theta}$ | L, A, B | $\theta$ |

(Note that in this section partially specified operators will be simply referred to as operators.) Thus, for example $\sigma_{f1(A1,A2)} \geq \alpha, \sigma_{f2(A1,A2)} \geq \alpha$ amd $\sigma_{f1(A3,A4)} \geq \alpha$ are considered different operators in Ω because they either use different similarity functions or are based on different numbers.

To facilitate clarity and understanding, a simpler case is first considered in which Ω includes only cross product, similarity selections and unions. This case is closely related to the decision-tree learning problem, thus those techniques can be employed to create a package. Later, this adaptation is extended to a more general case where Ω also includes rename and split operators. By exploiting the identified relationship between package creation and decision tree construction problems, the innovation can benefit from a large body of research on decision tree classification. For instance, the innovation can benefit from techniques for building decision trees and for improving the ability to generalize to examples not in the training set Δ. Although using learning techniques to solve record matching problems is not per se new, no earlier techniques consider learning packages over a set of primitive operators (e.g., data cleaning, relational . . . ). More significantly, previous learning techniques are not able to handle rename operators, which are extremely important for obtaining accurate record matching packages.

Selection-only packages decide whether or not an example represents a matching pair based only on the similarity scores (i.e., values of similarity functions in Ω). Conceptually, the training set Δ is extended by adding new derived columns $E_1, \ldots, E_n$. Each $E_i$ value of a tuple $t=\langle r,s \rangle \in \Delta$ corresponds to the similarity, measured by similarity function $f_i$, between tuples r and s. The relation including IDS and the derived columns can be referred to as a feature table or similarity feature table provided by feature table component 310. It is observed that a selection-only package is closely related to a decision tree classifier which predicts whether or not examples are matches using only the derived attributes $E_1, \ldots, E_n$. This decision tree is produced by tree component 320. Given such a decision tree, the corresponding selection-only package can be constructed by package component 330 as the union of all branches in a decision tree, which predict examples to be matches. The following example illustrates the approach of constructing an extended feature table, building the decision tree and then translating it into a package, as performed by components 310, 320 and 330, respectively.

Figures 4A, 4B:
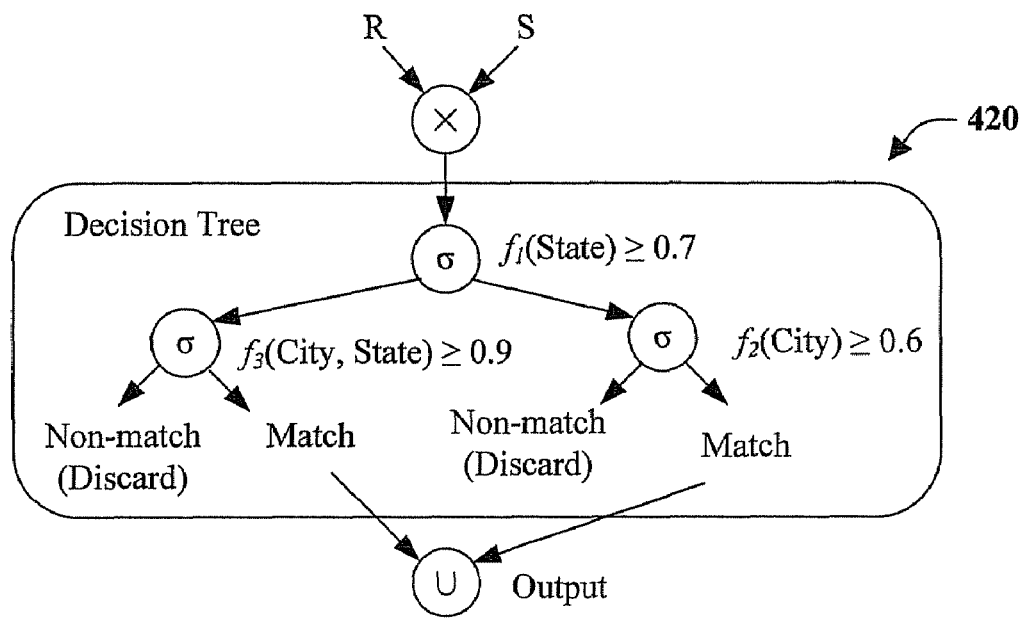
FIGS. 4a-c illustrates exemplary package generation structures.

Consider the running example in FIGS. 2a and b. Suppose there are two similarity functions $f_1$ and $f_2$ (e.g., edit similarity and Jaccard similarity), each of which can be used to compare a pair of values of City and State, respectively, and another similarity function $f_3$ (e.g., edit similarity) that applies to (City, State). New attributes $f_1$(City), $f_1$(State), $f_2$(City), $f_2$(State) and $f_3$(City, State) can be derived to produce a feature table 410, as shown in FIG. 4a (if similarities are not dynamically computed). Note that $f_i(A)$ is the abbreviation for $f_i(R.A, S.A)$. Each row in the feature table represents a training example. Having this table, a known decision tree construction algorithm can be applied to build a decision tree as shown in FIG. 4b. The dotted rectangle 420 in FIG. 4b encloses an example of a decision tree where the leaf nodes are labeled match or non-match.

Presented hereinafter is a discussion of how a decision tree can be generated within the context of a record matching package. The first operator in the package is initialized to be a cross product between input relations R and S. The package is then grown one operator at a time. Each point p in the frontier of the package is associated with a subset $\Delta_p$ of the initial training examples Δ. In the beginning, all the training examples Δ are assigned to the first frontier point (i.e., the point after the cross product operator). For each frontier point p, the best operator is chosen based on an operator selection procedure (described below), and the operator is added into the current package at point p. Subsequently, the newly added operator, for instance $\sigma_{fi(A1, A2)} \geq \alpha$, is applied to the example set $\Delta_p$, partitioning $\Delta_p$ into two subsets: $\Delta_{p1}$ and $\Delta_{p2}$, which are in fact the two outputs of $\sigma_{fi(A1, A2)} \geq \alpha$ (the right output $\Delta_{p1}$ is the set of examples that satisfy $fi(A_1, A_2) \geq \alpha$ the left output is the set $\Delta_{p2}$ that does not). These two output points are now added to, and the point p deleted from, the list of current frontier points. The procedure can then recurse on each of the current frontier points to grow the package until a stopping criteria is met. For instance, recursion can be stopped when the number of training examples at the current point is less then a threshold or if all the examples are all either matches or non-matches. After stopping, various techniques such as decision tree pruning can be utilized.

At any frontier point p, candidate selection predicates can be searched and the predicate $f_i(A_1, A_2) \geq \alpha$ that maximizes a benefit function measured over the training set $\Delta_p$ can be selected. Informally, the benefit quantifies the quality of using a specific operator at a node. In the example illustrated in FIGS. 4a-b, intuitively $f_1$(State)$\geq 0.7$ is chosen because when the training examples are split based on this criterion into two parts, the part with $f_1$(State)$\geq 0.7$ (the last four rows) includes most of the matching examples and the other part with $f_1$(State)$<0.7$ (the first five rows) includes most of the non-matching examples.

Although not limited thereto, herein the error measure is utilized as the benefit function. The error on data $\Delta_p$ at point p is the smaller package error between the package that treats all $\Delta_p$ as matches and the one that treats all $\Delta_p$ as non-matches. The error after applying a similarity selection to $\Delta_p$ is the sum of the error on $\Delta_{p1}$ and that on $\Delta_{p2}$. The amount of error reduced by this operator is its benefit. Note that the choice of benefit function is orthogonal to the tree construction. Commonly used impurity functions such as informational gain, gini index and the like can also be utilized. However, they do not handle variable costs of misclassification as required by the package error measure.

At each point in p, the frontier in decision tree is labeled either a match or a non-match. The weighted errors $e_1$ and $e_0$ obtained by classifying all examples $\Delta_p$ associated with p in the frontier as matches and non-matches, respectively, are calculated. If $e_1$ is smaller, the point p is labeled as match; otherwise, the point is labeled non-match. Finally, the leaves labeled match are connected to a union operator as shown in FIG. 4b.

Figure 4C:
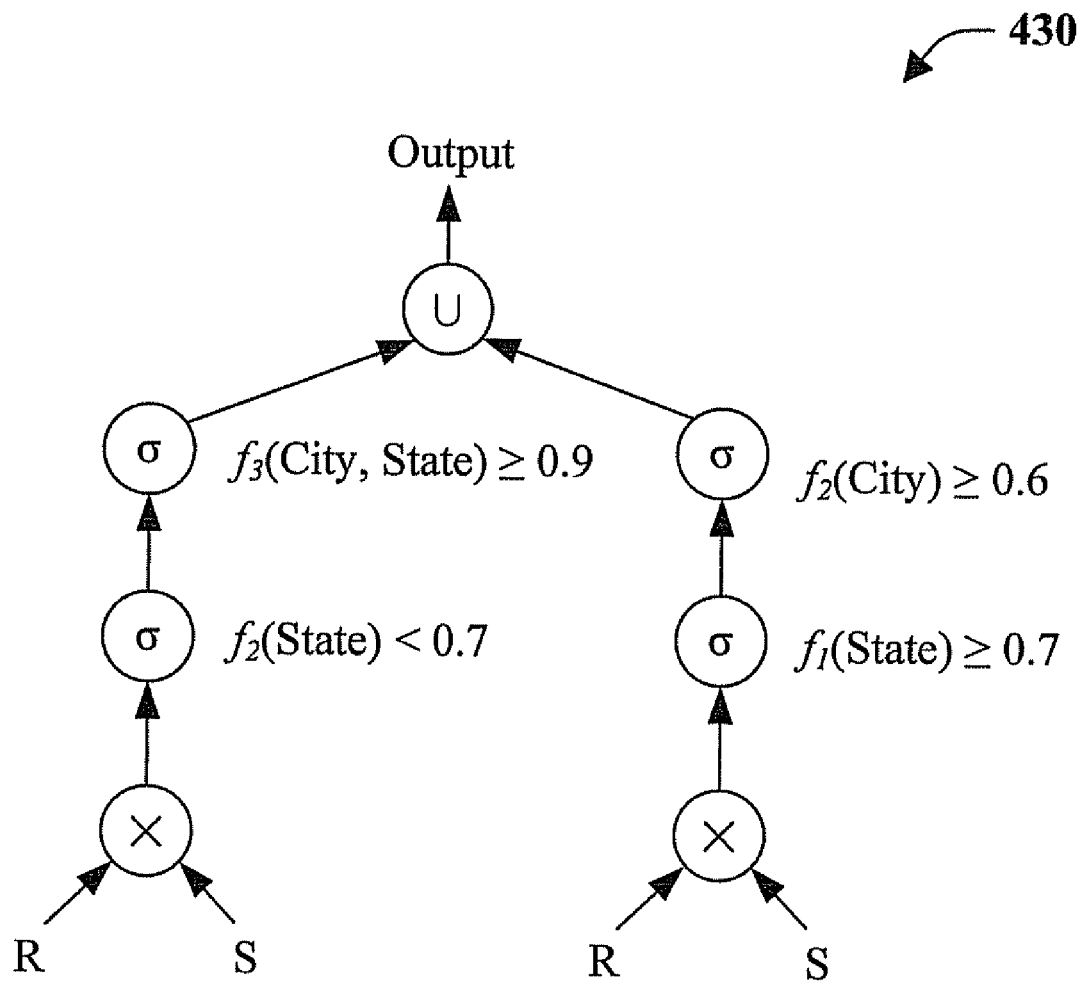

Turning to FIG. 4c, the decision tree can be translated into a package. In particular, the union of all paths to the leave nodes of the decision tree labeled match can be determined and utilized. Note that the package now also corresponds to a standard relational operator tree. The package representation is flipped upside down to conform to the standard where data flows upward. The package representation 430 is derived from the decision tree 420 of FIG. 4b.

Although other classification models (e.g., support vector machines . . . ) may be applied within the subject framework, the resulting models cannot always be translated to a package built with the primitive operators discussed thus far. In particular, more sophisticated similarity selection and similarity join operators allowing predicates involving linear combinations over similarity functions and thresholds can be utilized.

Now the package generating/learning procedure performed by generation component 130 is generalized to consider all primitive operators (e.g., including rename and split) previously mentioned. The primary challenge here is that with rename operators the order of transformation operator invocation becomes important even for preparing the feature table. For instance, the orders FD(L, A→B, 0.8), FD(L, B→C, 0.9), edit-similarity>0.90 and FD(L, B→C, 0.9), FD(L,A→B, 0.8), edit-similarity>0.90 result in different feature tables. Considering all possible orders of transformation operators and all possible parameters, where transformation operators are parameterized is infeasible. Therefore, the decision tree construction procedure is extended to incorporate transformation operators in its search.

Figure 5:
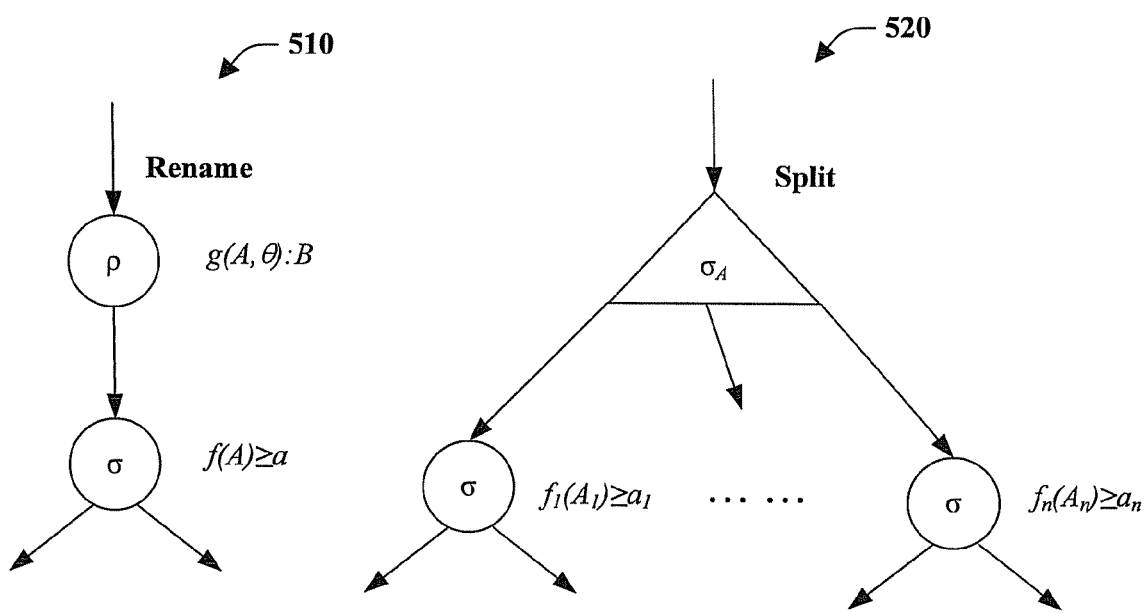
FIG. 5 illustrates benefit measures for the rename and split operators.

The top-level process is almost the same as that for selection-only packages. After the first cross product, adding an operator into the current package is considered. All the operators in Ω with all possible threshold values can be tried. Their benefits based on training examples can be measured and the one with the highest benefit chosen. The process can then recur on the output(s) of the chosen operators. The stopping criterion can be the same. The benefit measures for split and rename operators are as follows:

A rename operator just modifies the data so that subsequent similarity selections can better identify matches. For instance, converting the organization name to a standard representation (e.g. using fuzzy lookup against a reference table from the Yellow Pages™) may improve the chances of two records representing the same organization being recognized as matches. Therefore, as illustrated in FIG. 5 at 510, application of each similarity selection operator in Ω is considered in turn to the output of the rename operator, and the benefit of this sequence, rename followed by a selection operator, is measured as a whole. The appended similarity selection is now evaluated based on the renamed values. Note that the appended selection is used to measure the benefit of a rename. If chosen, the rename operator will be added into the current package. The appended selection will not be added in automatically, because it may not be the best next operator. The best next operator may be another rename or a split.

The above discussion describes the case where only the attributes of one of R and S need to be renamed. However, there are cases where both tables need to be renamed before similarity comparisons. For example, R.State and S.State may both contain "dirty" values. In this case, to better measure the benefit of renaming R.State, S.State should also be renamed before appending a temporary similarity selection. To handle this case, we alternatively evaluate the benefit of a rename operator on R.A by appending the same rename on S.A using the same threshold value followed by a temporary similarity selection. Since both R.A and S.A are renamed using the same threshold, the cost of the search is not increased.

Referring to reference 520 of FIG. 5, the benefit of a split is illustrated. The split operator is intended to be used so that different subsets can be processed differently, and not to distinguish between matches and no-matches based merely on one attribute value. Thus, the technique for measuring the benefit of a rename operator can be used here. For each branch of the split, the best similarity selection is logically appended to its output, and the overall benefit of the split is measured. Note that when a tree is translated into a package, split operators can be replaced by standard relational selections.

Figure 6:
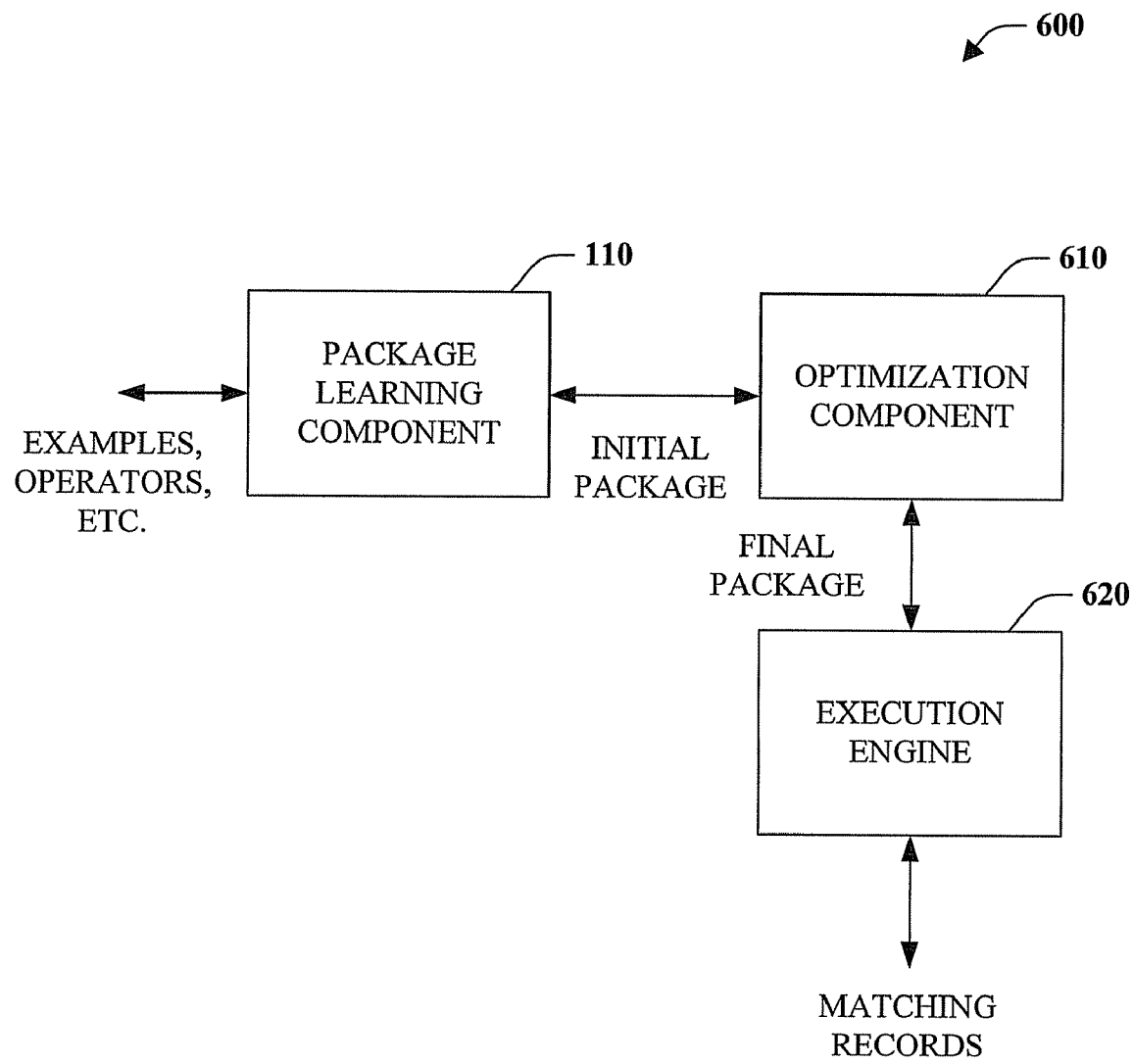
FIG. 6 is a block diagram of a two-phase system for generating record matching packages.

Turning attention to FIG. 6, a two-phase package creation system 600 is illustrated in accordance with an aspect of the subject innovation. The system 600 includes a package-learning component 110, as previously described. In brief, component 110 performs the first phase of the system 600 namely generating or learning an initial package over a set of training examples. Optimization component 610 is communicatively coupled to the component 110. It provides a mechanism for optimizing an initial package to facilitate execution via execution engine 620. For instance, in accordance with one implementation the class of packages considered can be restricted to those having a cross product operator between input relations as the first operator. Evaluating such packages naively by applying the cross product and then filtering may be excessively expensive. Accordingly, optimization component 610 can utilize a rewriting technique to replace the cross product operator with similarity joins, which can usually be evaluated by execution engine 620 much more efficiently.

Packages returned by the package-learning component 110 are similar to a regular relational operator tree. The main difference is that the packages may contain data cleaning operators, which cannot be handled by a conventional query optimizer. However, properties of these new operators can allow optimization techniques to be applied. It is to be appreciated that the properties identified herein can also be used to extend a cost-based query optimizer to handle data cleaning operators. Thus, optimization component 620 can correspond to such an extended optimizer.

A primary observation is that the sequence, cross product between relations R and S followed by a "higher-than-threshold" selection predicate $f(A_1,A_2) \geq \alpha$, can be replaced by a single similarity join $\bowtie_{f(A1, A2) \geq \alpha}$. In order to facilitate such a rewrite however, the package needs to be transformed such that all operators between a cross product and a higher-than threshold selection predicate are either pushed down or pulled up.

Figure 7A:
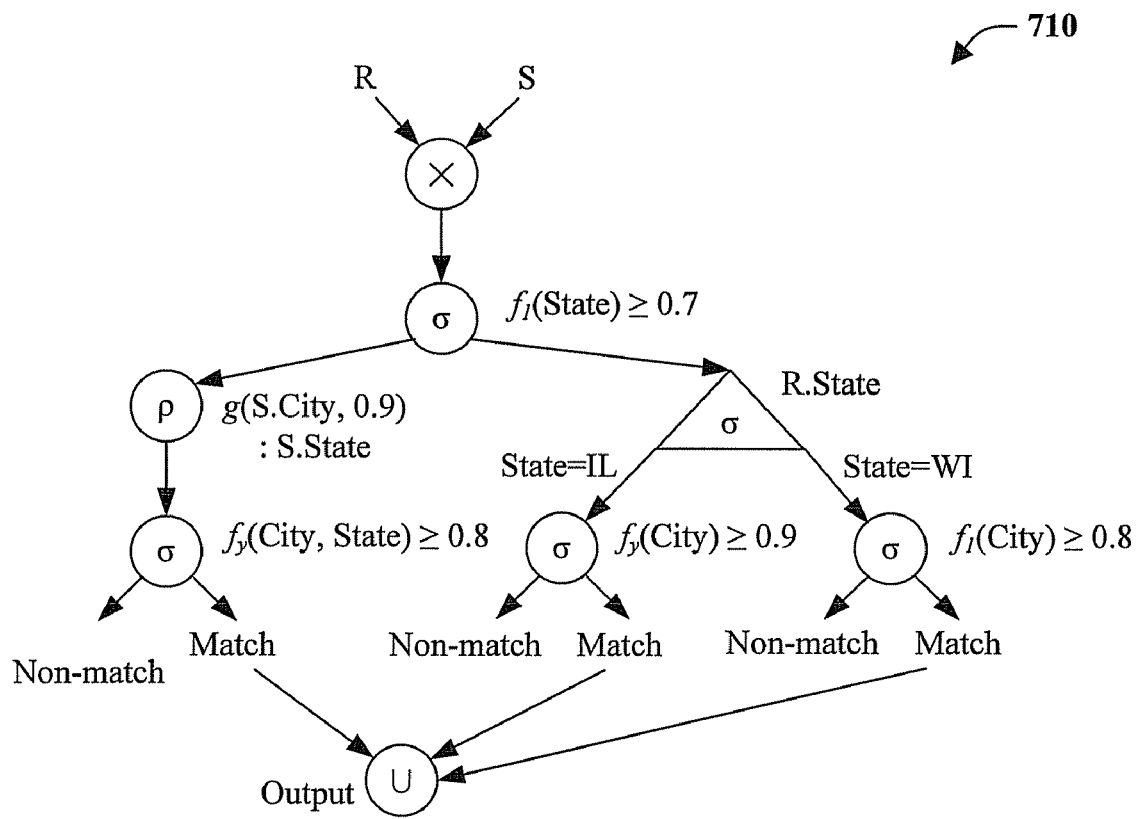
FIG. 7a-c illustrates an example of package optimization.
Figure 7B:
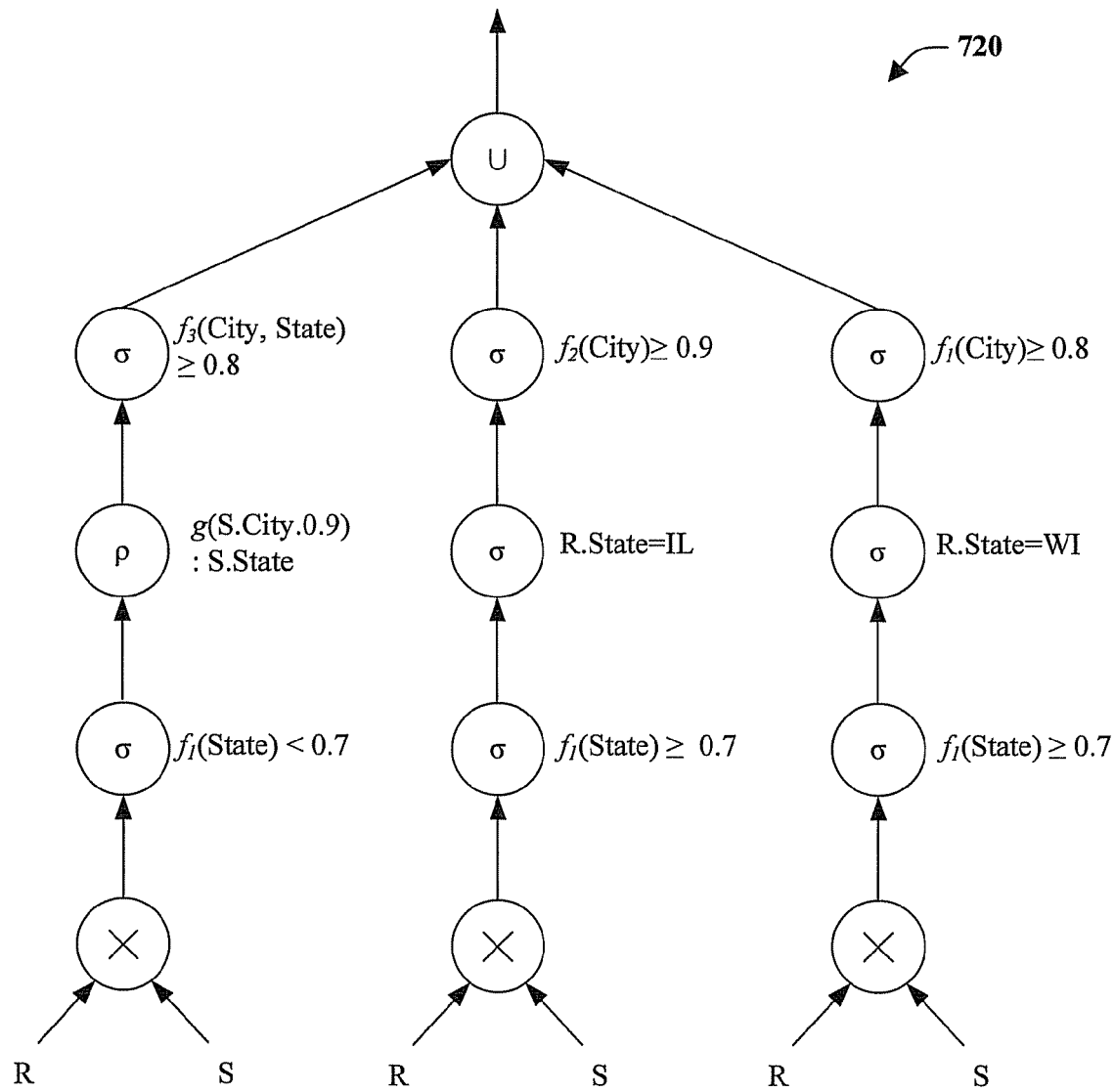
Figure 7C:
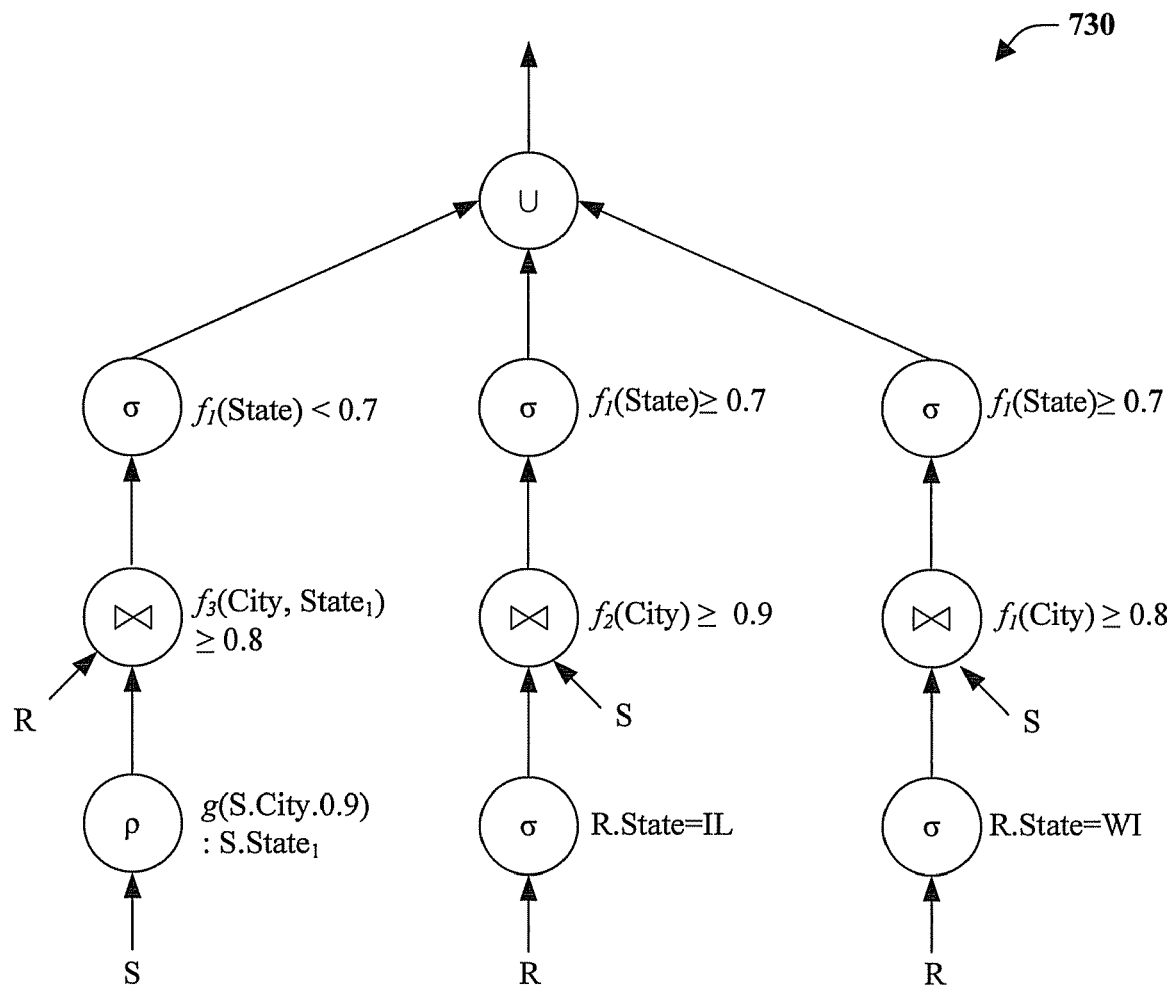

FIGS. 7a-c provide an example to illustrate optimization functionality in accordance with an aspect of the innovation. FIG. 7a provides an exemplary decision tree 710 that starts with a cross product of two relations R and S and performs a union on all leaf nodes that match. FIG. 7b illustrates an initial learned package 720 that can be generated by the package learning component 110 of FIG. 6 based on training data. Package 720 looks similar to a relational query plan and can be rewritten by optimization component 610 into an equivalent package that optimizes execution as shown in FIG. 7c. Observe that the rewritten package 730 does not have a cross product; they have been replaced by similarity joins, which can be evaluated much more efficiently.

We now briefly introduce some equivalence properties based on which a package can be transformed without changing its output. Recall that each package can be a union of paths each of which start with a cross product and may also have similarity selection, rename, and standard relational operators. Note that the split operators can be translated to relational selections. Operators $op_1$ and $op_2$ commute with each other if exchanging the order of adjacent operators $op_1$ and $op_2$ does not change the output of the package on any input.

In order to state the commutativity properties for the new operators (e.g., renames), recall the notion for the operators here. The threshold values do not influence the commutativity properties and they are dropped from the notation. $\sigma_A$ denotes a standard relational selection that selects data based on the attribute A=c, A$\geq$c or A<c, where c is a constant. $\sigma_{f(B1, B2)}$ denotes a similarity selection that filters data based on the similarity between B1 and set B2 of attributes. $\rho_{g(G):H}$ denotes a rename operator that modifies attribute H based on a set G of attributes. For clarity, assume that H is a single attribute; the discussion generalizes to a set. × denotes the cross product operator.

More formally, let $\rho_{g(G):H}$ be a rename operator:
$\rho_{g(G):H}$ commutes with $\sigma_A$ if A$\neq$H.
$\rho_{g(G):H}$ commutes with $\sigma_{f(B1, B2)}$ if H$\notin$ B1 and H$\notin$ B2
$\rho_{g(G):H}$ can be pushed below R×S to R if both G and H are from R.
$\rho_{g(G):H}$ commutes with $\rho_{g(C):D}$ if D$\notin$ G and H$\notin$ C and D$\neq$H The commutative properties for operations previously discussed with respect to package creation are summarized in Table 2 below:

TABLE 2

|  | $\sigma_E$ | $\sigma_{f(F1,F2)}$ | X | $\rho_{g(G):H}$ |
|---|---|---|---|---|
| $\sigma_A$ | Yes | Yes | Yes | if A $\neq$ H |
| $\sigma_{f(B1,B2)}$ |  | Yes | No | if H $\notin$ B1 $\wedge$ H $\notin$ B2 |
| X |  |  | Yes | if G and H are in the same table |
| $\rho_{g(C):D}$ |  |  |  | if D $\notin$ G $\wedge$ H $\notin$ C $\wedge$ D $\neq$ H |

By way of example, consider FIG. 7b (left path) $\rho_{g(S.City, 0.9):S.State}$ does not commute with either $\sigma_{f1(State)<0.7}$ or $\sigma_{f3(City, State)\geq 0.7}$. However, $\rho_{g(S.City, 0.9):S.Zip}$ commutes with both the similarity selections. The same institution holds for the split operation as well.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

Figure 8:
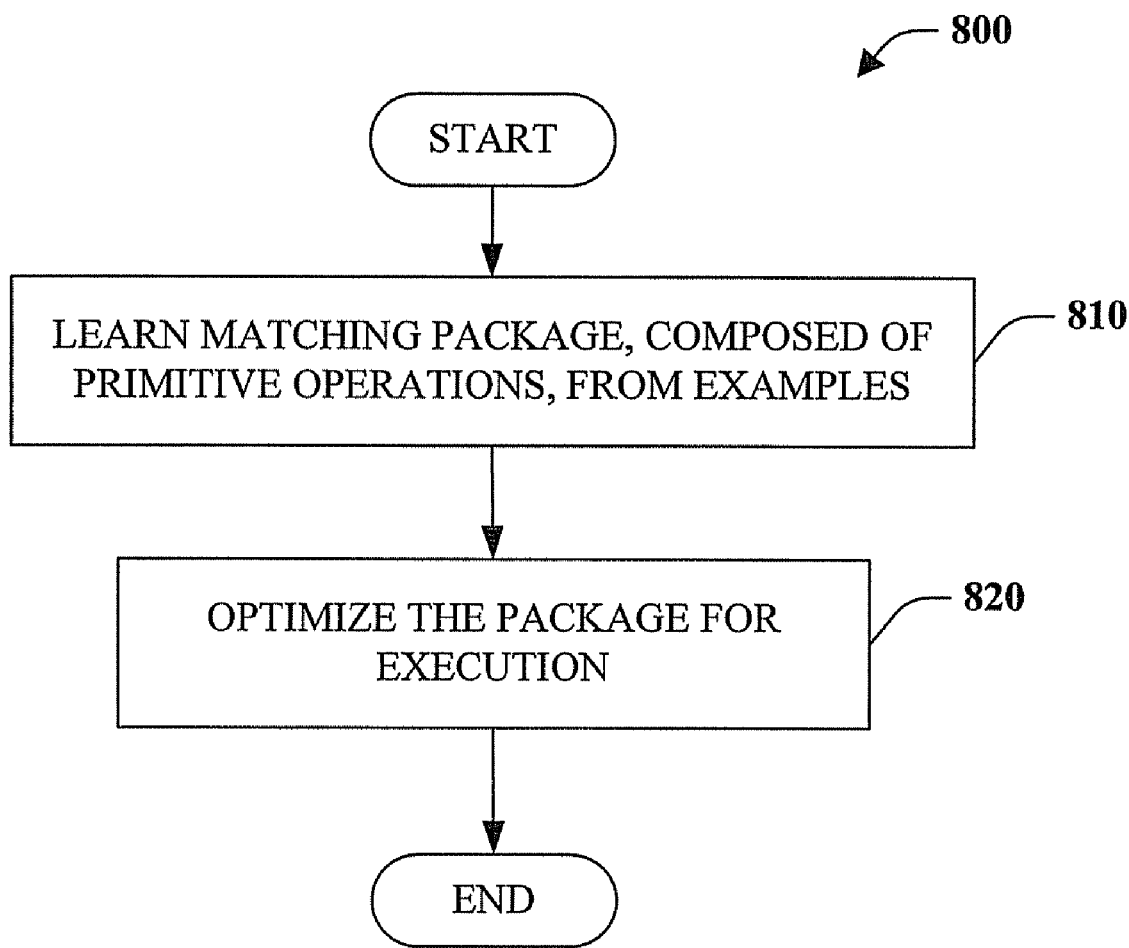
FIG. 8 is a flow chart diagram of a method of generating a matching query package.
Figure 9:
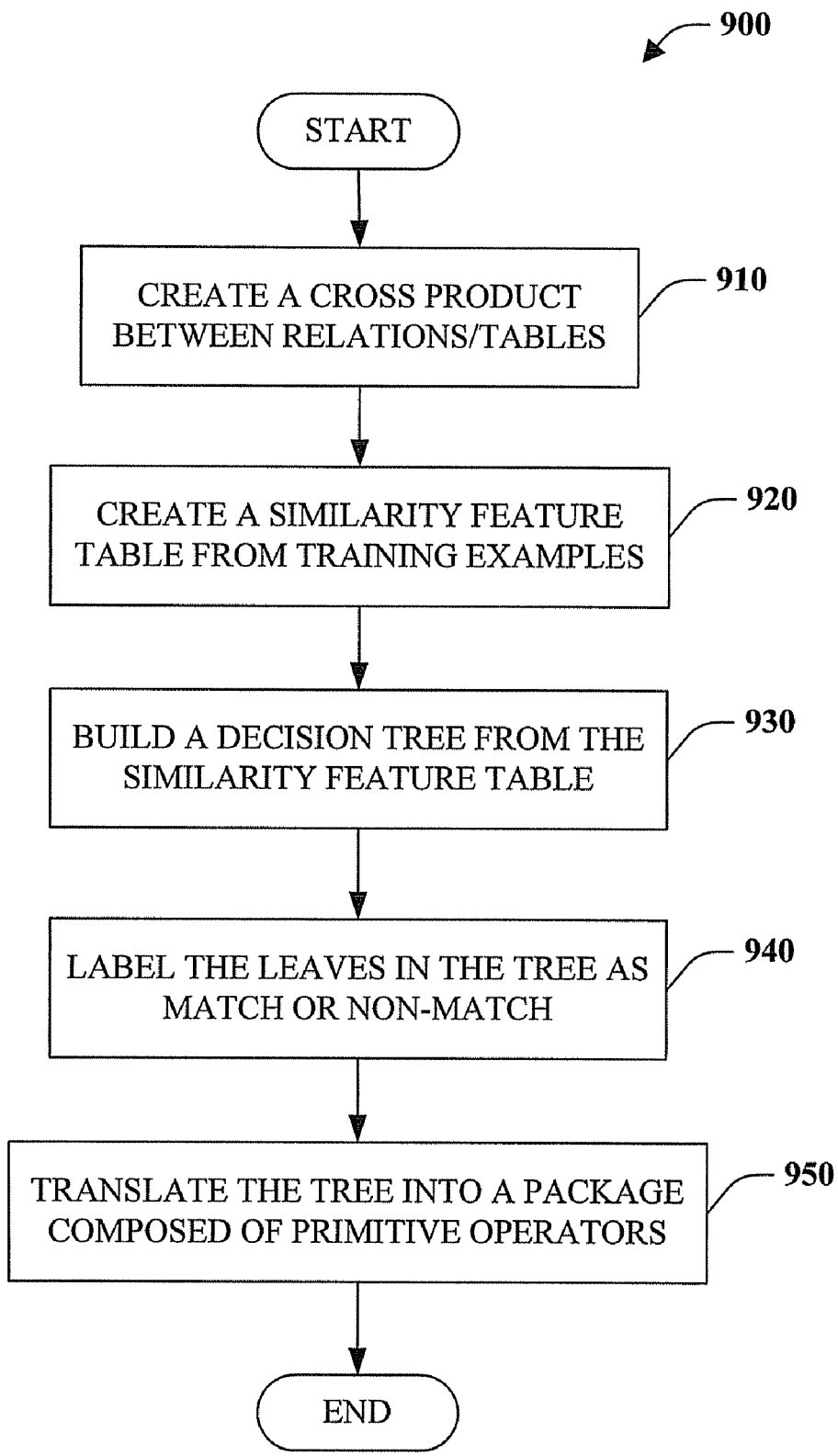
FIG. 9 is a flow chart diagram of a method for learning a query package.
Figure 10:
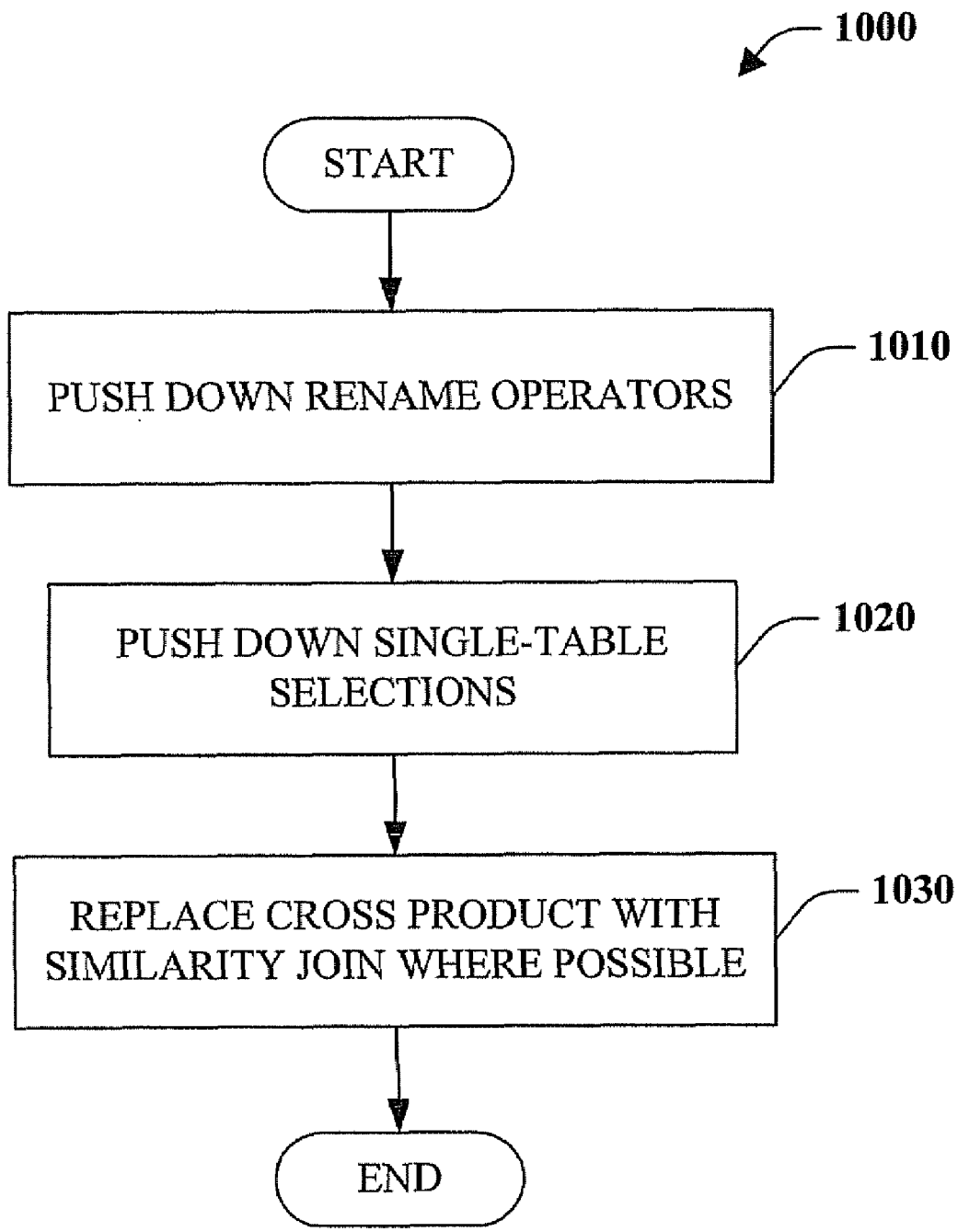
FIG. 10 is a flow chart diagram of a optimization method.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, illustrates a method 800 of generating matching query packages. Here, method 800 describes a two-stage approach in accordance with an aspect of the subject innovation. At reference numeral 810, an initial matching package, composed of primitive operators (e.g., relational operators, data cleansing operators . . . ), is learned based on a set of examples. In addition to being powerful and flexible, the operators comprising the package are easy to understand and conducive to modification by designers. At numeral 820, the initially generated package is optimized for execution. In other words, an equivalent matching query is produced that executes more efficiently. By way of example and not limitation, cross products in the initial package can be replaced by similarity joins.

FIG. 9 depicts a method 900 for generating an initial matching query package in accordance with an aspect of the subject innovation. At reference numeral 910, a cross product is created between two relations (e.g., tables). A similarity feature table (or like structure) is generated with respect to the relations utilizing a set of training examples specifying matches and non-matches, at 920. As described previously, generation of such a structure is not strictly necessary, as required information can be determined dynamically. At reference numeral 930, one or more decision tree construction algorithms can be employed to construct a decision tree following the initial cross product. The leaves of the decision tree are labeled or otherwise identified as a match or non-match at 940. At numeral 950, the decision tree is translated into a package, for instance by taking the union of decision tree matching paths. The produced package can be represented as a standard relational operator tree that can be employed to generate specific instructions.

FIG. 10 illustrates a method 1000 of optimizing an initial matching query package. More specifically, method 1000 can transform a package so that cross products are replaced by the similarity join operator. The main challenge is due to the presence of rename operators, which as previously described, do not always commute with the similarity selection operator. For clarity in description, assume for the rest of this section that attributes G and H in a rename operator $\rho_{g(G):H}$ are both in the same relation (e.g. either R or S) and the attributes $A_1$ and $A_2$ in a similarity section operator are from different relations R and S.

One of the main insights identified previously (Table 2) is that a rename operator $\rho_{g(G):H}$ commutes with all the other operators if H does not overlap with the attributes in the other operations. Thus, intuitively whenever one needs to push a rename operator below another operator that does not commute with a rename, a new derived attribute H' (that has not been used in any other operator) can be added and $\rho_{g(G):H}$ can be replaced with $\rho_{g(G):H'}$. This is illustrated using the following example.

Consider an example package such as the one in FIG. 7b. It has three paths leading up to a union operator. The middle path is considered first. This path maybe transformed using rewrite rules based on relational algebra. According to Table 2, all the operators in that path commute with one another. Thus, one can push R.State=IL down to table R, and pick a (or perhaps the most selective) similarity selection (e.g., $f_2$(City) $\geq 0.9$) and combine it with the cross product, which results in the similarity join $\bowtie_{f_2(City) \geq 0.9}$. The rightmost path is also optimized similarly.

Now, consider the leftmost path. This path cannot be transformed using the commutatively properties summarized in Table 2. However, the rename operator can still be pushed down as follows: Add a new attribute S.State1 to S, which is a copy of attribute S.State (where attribute values are actually replicated) and the corresponding attribute R.State1 to R, which is just an alias of R.State (where attributes values are not copied). The rename operator $\rho_{g(S.City, 0.9):S.State}$ can be changed to $\rho_{g(S.City, 0.9):S.State1}$. To ensure equivalence of the transformation, every occurrence of State after the rename operator can be changed to $State_1$. In this case, the predicate of the following similarity selection becomes $f_3$(City, $State_1$) $\geq 0.8$. Now, the rename operator commutes with all the operators before it. Thus, one can push the rename down to S. Since the renaming operators commute with each other, the most selective one (e.g., $f_3$(City, $State_1$) $\geq 0.8$) can be moved next to the cross product and pack them into a similarity join.

Method 1000 generalizes the above example with respect to rewriting to optimize each path in the learnt package. More specifically, rename operators can be pushed down at 1010. For each rename operator $\rho_{g(R.A, \theta):R.B}$ (exchange R and S if the rename operator is on S) from the bottom one to the top one, a new attribute R.B' can be added to R and $\rho_{g(R.A, \theta):R.B}$ can be changed to $\rho_{g(R.A, \theta):R.B'}$ where B' is an unused attribute name. Further, the corresponding attribute S.B' that is just an alias of S.B can be added and every occurrence of B in any subsequent (upper) operator to B' For example, consider the following path: $\sigma_{f_1(B)}\rho_{g_1(R.B):R.B}\sigma_{f_1(B)}\rho_{g_2(R.B):R.B}\sigma_{f_3(B)}$(R×S), where thresholds are omitted for ease of expression. After the rewriting, the path becomes: $\sigma_{f_1(B'')}\rho_{g_1(R.B'):R.B''}\sigma_{f_1(B')}\rho_{g_2(R.B):R.B'}\sigma_{f_3(B)}$(R×S). Note that B' and B'' are new attributes and, according to Table 2, each rename commutes with all the similarity selections to its right (below it). As a final step, all the rename operators are pushed down to the base table, preserving order. Then, the example becomes $\sigma_{f_1(B''')}\sigma_{f_1(B')}\sigma_{f_3(A)}((\rho_{g_1(B'):B''}\rho_{g_2(B):B'}R)\times S)$. Now all operators above the cross product commute with one another. At reference numeral 1020, single-table selections can be pushed down. Single-table selections (e.g. resulting from split operator) can be pushed down to the base table. At numeral 1030, cross products are replaced with similarity joins. The similarity selection or the most selective one, if selectivities can be estimated, is moved next to the cross product and the cross product is packed into the similarity selection if possible.

According to Table 2, all the above re-orderings are safe. Thus, the resulting package is equivalent to the original one. Note that it is at least in principle possible that a greater-than threshold similarity selection may not be found to generate the join for a path. This is an unusual phenomenon: dissimilar pairs of records match each other. In this case, either the similarity functions are inadequate or the training examples contain errors. A user can be alerted to prompt further information in such a scenario.

There are several other opportunities (e.g., user driven, cost-base automation . . . ) for optimizing a package. Because the output packages are interpretable by a domain expert and the semantics of the operators are well defined, the expert may rewrite the package to yield semantically equivalent packages by considering both the properties of the operators, common sub-expressions, and the data characteristics.

In particular, one can exploit the shared intermediate results between paths. For instance, the middle path and the right path of tree 720 (FIG. 7b) share the same similarity selection $\sigma_{f_1(State)} \geq 0.7$. Thus, they both benefit from the similarity join $R\bowtie_{\sigma f_1(State) \geq 0.7}S$. Many conventional ETL (Extract, Transform, Load) engines can execute directed acyclic graphs over operators and hence already allow shared execution for common paths. Further, view materialization may be effectively employed for sharing intermediate results. A cost-base optimization can also be utilized to rewrite packages and evaluate the benefit of materializing views for shared intermediate results. However, the challenge here is to consider the additional data-cleaning operators such as similarity join and rename operators along with the standard relational operators.

Recall that the goal of the package creation problem is to minimize the error on R×S, while the techniques discussed above built a package for a given training set. Even approaches based on random sampling for collecting training examples provide probabilistic guarantees on the accuracy of the overall package learnt. Under the probabilistically approximately correct (PAC) model, if a teacher classifies a random sample of R×S without any error, and the learner builds a perfect (100% accurate) model on this sample, then this model is expected to have a very high accuracy on the entire dataset R×S.

In many record matching scenarios, the number of non-matching pairs is significantly higher than the number of matching pairs. In such cases, the number of examples required in a sample for it to contain a reasonable number of matching pairs is very high. Thus, the burden on the teacher increases significantly. Herein, active learning techniques can be leveraged such that examples are chosen carefully to maximize the overall gain.

Two other significant issues are now addressed. First, the issue of letting users control the resulting package structure addressed. Secondly, improving the efficiency of package learning is discussed.

Often a package designer may desire to control the structure of the output of the package learnt. Requirements may stem either from knowledge of the domain or from an efficiency standpoint, among other things. Consider once again the example provided in FIGS. 2a-c. Suppose it is known that the information in the City attribute is in general gleaner than that in the State attribute. Therefore, a designer may want to first correct values in the State attribute using the FD-correction operator $\rho_{FD(City, \theta):State}$ before invoking the $f_1$(State) similarity function. In this case, $\rho_{FD(City,\theta):State}$ is called the prerequisite of $\sigma_{f_1(State)}$. Suppose it is also know that similarity joins based on the similarity function $f_1$ (e.g. edit-similarity) are much more expensive than those based on the function $f_2$ (e.g., Jaccard similarity). Therefore, for efficiency reasons, one might require $\sigma_{f_2(A)}$ to be the prerequisite of $\sigma_{f_1(A)}$, where $A \in$ City, State. Hence, in the learning phase, adding $\sigma_{f_2(A)}$ into the current package will only be considered when $\sigma_{f_1(A)}$ has been applied.

The subject innovation allows users to specify such structural constraints on the desired package. The intuition is to divide all operators into equivalence groups. The groups are then partially ordered where any operator in a group has to be preceded in the package by at least one operator each in all preceding groups.

It is fairly straightforward to enforce the structural constraints while building decision trees and hence the package. While learning a package, whenever an operator is chosen to grow the package only candidate operators that satisfy constraints are considered. Package rewriting has to also respect these constraints.

As per improving efficiency of the learning algorithm, the main observation is that during the package-learning phase, similarity scores according to all functions are computed repeatedly. Therefore, if the computed similarity values are cached, learning efficiency can be improved significantly, especially when some of the similarity functions such as edit distance are expensive to compute. The feature table 410 in FIG. 4a illustrates such a cache. The challenge however is to deal with rename operators, which modify records and hence impact the values returned by similarity functions.

Recall that to measure the benefit of $\rho_{g(A, \theta):B}$ all possible values of $\theta$ are tried, and for each $\theta$, the best similarity selection needs to be found on the renamed data. In general, the rename operate should be executed once for each $\theta$ value to obtain the renamed data. However, for threshold-based renames, this repeated computation can be avoided by caching similarities between tuples. For this class of rename operators, the benefit of a higher threshold, such as 0.9, can be obtained from the information when the threshold was set at 0.8. Thus, the computed benefit for a small threshold value can be reused for higher threshold.

More formally, a rename operator $\rho_{g(A, \theta):B}$ is threshold-base if its rename function $g(A, \theta)$ is threshold based. $g(A, \theta)$ is threshold based if it can be decomposed into two functions: a potential function $p(A)$ that returns a number and a transformation function $t(A)$ that returns a value DOM(B), such that $g(A, \theta)$ returns $t(A)$ if $p(A) \geq \theta$; otherwise, it returns NULL.

The fuzzy lookup and the FD-correction operators are threshold based renames. The potential function $p(A)$ for a fuzzy lookup is a similarity function that returns similarity between the join attributes. The potential function $p(A)$ for an FD-correction with A→B returns the level of the dominant B value in the A group.

Figure 11:
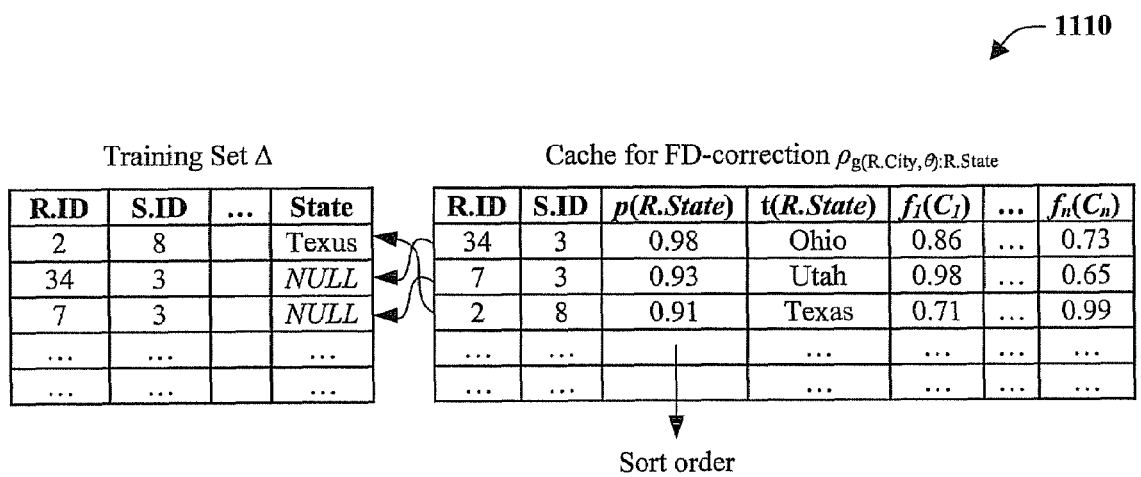
FIG. 11 depicts an exemplary rename cache.

Referring to FIG. 11, an exemplary cache 1110 for a threshold rename operator is illustrated. The cache for a threshold-based rename $\rho_{g(A, \theta):B}$ is a table with attributes [R.ID, S.ID, p(A), t(A), $f_1(C_1)$, ..., $f_n(C_n)$], where (R.ID, S.ID) is the unique ID of a training example, attribute p(A) contains the potential values, attribute t(A) contains the new B values. For each $f_i(C_i) \in \Omega$ such that $B \in C_i$, attribute $f_1(C_i)$ contains it similarity values computed based on the new B values. Using this cache, the benefit of the rename can be measured on any threshold value $\theta$ without evaluating the rename operator or any similarity function. Consider measuring the benefit of $\rho_{g(City, 0.92):State}$ followed by $\sigma_{fi(Ci) \geq \alpha}$. For any training example, its $f_i(C_i)$ similarity value after rename can be obtained from the $f_i(C_i)$ attribute of the rename cache if $p(City) \geq 0.92$ (i.e., the first two rows of FIG. 11); otherwise, the $f_i(C_i)$ similarity value can be obtained from the feature table (e.g., see FIG. 2a). With these similarity values, measuring the benefit is straightforward and thus the details are omitted for purposes of brevity. Note that a feature table can be updated in a similar fashion.

As used herein, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
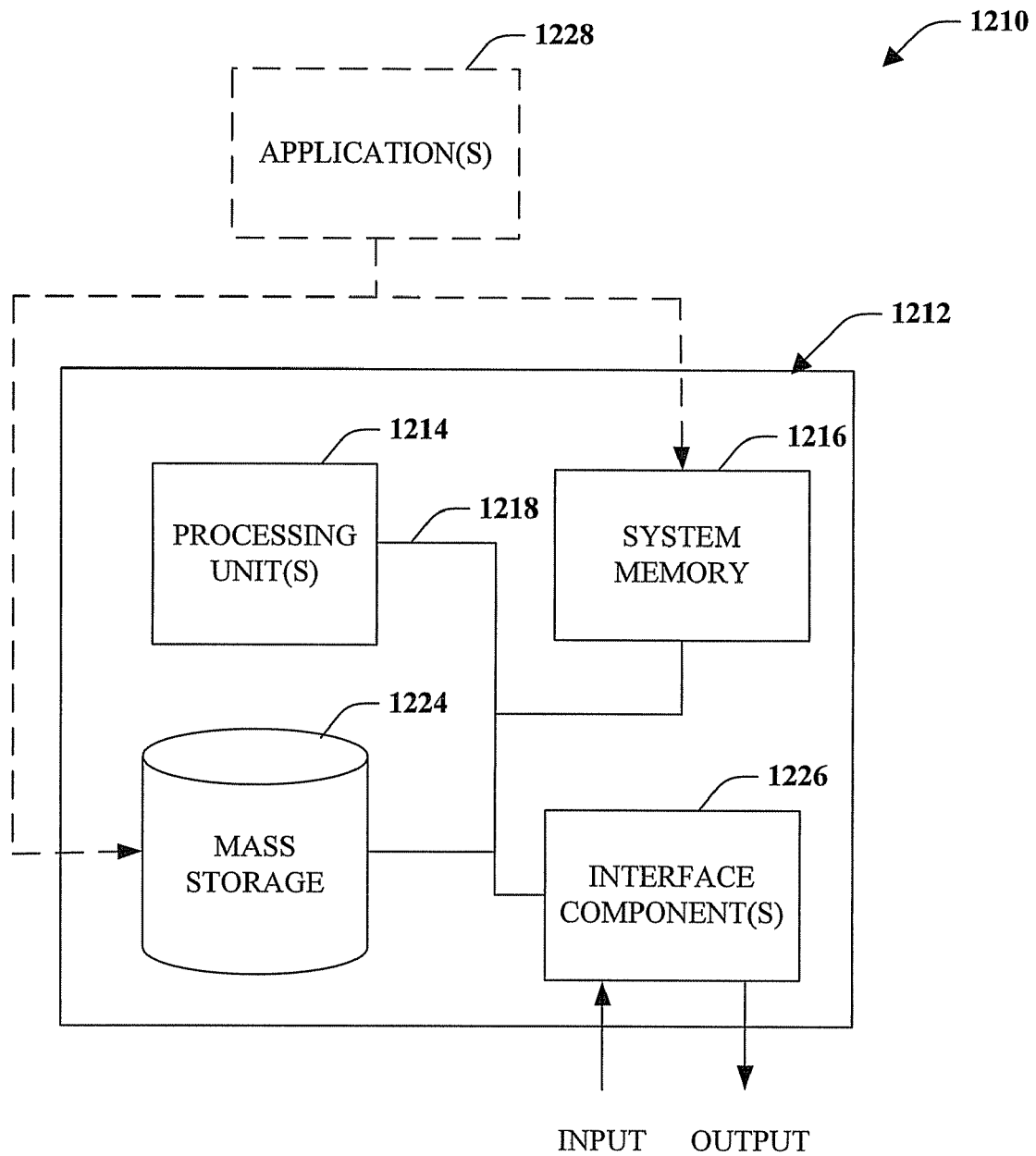
FIG. 12 is a schematic block diagram illustrating a suitable operating environment for aspects of the subject innovation.
Figure 13:
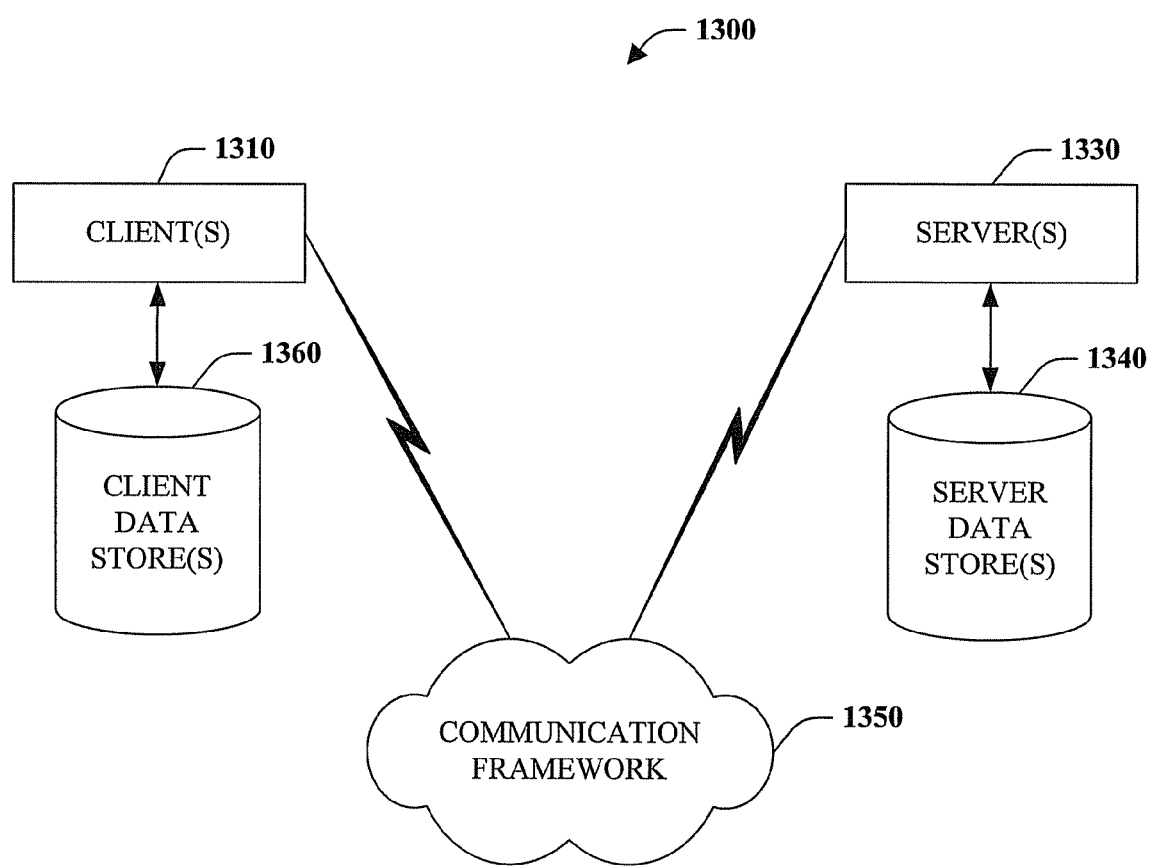
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216, and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/nonvolatile computer storage media. FIG. 12 illustrates, for example, mass storage 1224. Mass storage 1224 includes, but is not limited to, devices like a magnetic or optical disk drive, floppy disk drive, flash memory or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1212 to output device(s) via interface component 1226. Output devices can include displays (e.g. CRT, LCD, plasma . . . ), speakers, printers and other computers, among other things.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer implemented record matching system comprising the following computer-implemented components:
   at least one processor coupled to a memory, the processor executes;
   an interface component that acquires example pairs of matching and non-matching records;
   a generation component that automatically constructs a matching query composed with at least one primitive operator based on the example pairs, the primitive operators include data-cleaning operators including a functional dependency correction operator which corrects missing and incorrect value(s) in a record in a first table by determining a dominant value of a comparable value(s) in a reference table; and
   a feature table component that generates a similarity feature table based on the example pairs and a similarity selection function;
   wherein the primitive operators further include relational operators,
   at least one of the relational operators is a split operator that partitions a plurality of input relations into multiple disjoint subsets based on a single attribute that is either numerical or categorical,
   at least one of the relational operators is a numerical split operator includes two portions, the first portion of the numerical split operator is for input relations greater than or equal to a first threshold value, all remaining input relations are included in a second portion of the numerical split operator,
   at least one of the relational operators is a categorical split operator includes partitioning the input relations into n parts, where n is the number of distinct values in a domain of the input relations; and
   the numerical split operator and the categorical split operator are configured to return fewer partitions by grouping the single attribute values into a plurality of sets.

2. The system of claim 1, the data-cleaning operators further include at least one of similarity selection, similarity join, rename or column segmentation.

3. The system of claim 1, the generation component constructs a matching query that respects provided constraints that relate to domain knowledge and/or efficiency.

4. The system of claim 1, the generation component builds a decision tree from the example pairs and translates the decision tree into a matching query.

5. The system of claim 4, a first primitive operator in the decision tree is a cross product between two relations, and subsequent primitive operators are selected by the generation component based on an amount of error reduced by the first primitive operator with respect to the example pairs.

6. The system of claim 5, the generation component labels the decision tree leaves as either a match or a non-match.

7. The system of claim 6, the generation component determines the union of all paths to a plurality leaf nodes of the decision tree labeled match to translate the decision tree into a matching query.

8. The system of claim 1, further comprising an optimization component that rewrites the matching query to optimize execution of the matching query.

9. The system of claim 8, the optimization component replaces cross products with one or more similarity join operators.

10. A computer implemented method for creating a data matching package comprising:
   computing on a processor similarity data stored in memory from training examples utilizing at least one similarity function;
   generating a decision tree from the similarity data where leaves are marked as matching or non-matching by selecting a primitive operator, from a plurality of primitive operators, with a largest benefit from all available operators based on the training examples, the largest benefit is determined by a maximum benefit function; and
   converting the decision tree into a matching package comprising primitive operators;
   wherein the plurality of primitive operators include a functional dependency correction operator, a split operator and a rename operator,
   the split operator partitions a plurality of input relations into multiple disjoint subsets based on a single attribute that is either numerical or categorical,
   the functional dependency operator uses references tables and the knowledge of functional dependencies to correct missing and incorrect values in the similarity data, and
   the rename operator is any operator that produces one tuple for each input tuple and that the any operator commutes with a union operator.

11. The method of claim 10, further comprising determining a benefit for available primitive operators by calculating a respective error reduced by application of the available primitive operators, error is a cost of misclassifying matches and non-matches of the training examples.

12. The method of claim 10, marking the leaves comprises labeling a point as a match if a weighted error of classifying all examples at the point in the decision tree as a match is smaller than the weighted error of classifying all examples as a non-match, otherwise labeling the point as a non-match.

13. The method of claim 12, further comprising connecting all leaves labeled with match to a union operator.

14. The method of claim 10, converting the decision tree into a package comprises applying a union to all paths to leaf nodes labeled match.

15. The method of claim 10, further comprising optimizing the package for execution.

16. The method of claim 15, optimizing the package comprises replacing cross products between input relations with one or more similarity join.

* * * * *